US011236189B2

(12) United States Patent
Umebayashi

(10) Patent No.: US 11,236,189 B2
(45) Date of Patent: Feb. 1, 2022

(54) SOLID CATALYST COMPONENT FOR POLYMERIZATION OF OLEFINS, METHOD FOR PRODUCING SOLID CATALYST COMPONENT FOR POLYMERIZATION OF OLEFINS, CATALYST FOR POLYMERIZATION OF OLEFINS, METHOD FOR PRODUCING POLYMER OF OLEFIN, METHOD FOR PRODUCING POLYMER PROPYLENE COPOLYMER AND PROPYLENE COPOLYMER

(71) Applicant: TOHO TITANIUM CO., LTD., Chigasaki (JP)

(72) Inventor: Hidetoshi Umebayashi, Chigasaki (JP)

(73) Assignee: TOHO TITANIUM CO., LTD., Chigasaki (JP)

( * ) Notice: Subject to any disclaimer, the term of this patent is extended or adjusted under 35 U.S.C. 154(b) by 282 days.

(21) Appl. No.: 16/338,517

(22) PCT Filed: Oct. 3, 2017

(86) PCT No.: PCT/JP2017/035911
§ 371 (c)(1),
(2) Date: Apr. 1, 2019

(87) PCT Pub. No.: WO2018/066535
PCT Pub. Date: Apr. 12, 2018

(65) Prior Publication Data
US 2019/0233569 A1 Aug. 1, 2019

(30) Foreign Application Priority Data
Oct. 3, 2016 (JP) .............................. JP2016-195482

(51) Int. Cl.
*C08F 297/08* (2006.01)
*C08F 4/654* (2006.01)
*C08F 10/06* (2006.01)

(52) U.S. Cl.
CPC .......... *C08F 297/083* (2013.01); *C08F 4/654* (2013.01); *C08F 10/06* (2013.01)

(58) Field of Classification Search
CPC ............................ C08F 297/083; C08F 4/654
See application file for complete search history.

(56) References Cited

U.S. PATENT DOCUMENTS

| 5,578,541 A | 11/1996 | Sacchetti et al. |
| 2004/0092691 A1 | 5/2004 | Sacchetti et al. |

(Continued)

FOREIGN PATENT DOCUMENTS

| EP | 0533805 A1 | 3/1993 |
| EP | 0553805 A1 | 8/1993 |

(Continued)

OTHER PUBLICATIONS

Machine Translation, JP 2006-199975A. (Year: 2006).*

(Continued)

*Primary Examiner* — Catherine S Branch
(74) *Attorney, Agent, or Firm* — Westerman, Hattori, Daniels & Adrian LLP

(57) ABSTRACT

A solid catalyst component for polymerization of olefins is disclosed which can produce a polymer having low stickiness (tackiness) of polymer particles, excellent flowability, and favorable particle size distribution. The solid catalyst component for polymerization of olefins includes titanium, magnesium, a halogen atom and an internal electron donor, wherein the solid catalyst component has a multimodal pore volume distribution measured by a mercury intrusion method and has one or more peak tops in each of a pore (Continued)

radius range from 0.002 μm to 1 μm and a pore radius range from larger than 1 μm to 30 μm or smaller, and a ratio represented by pore volume V1 derived from pores in the radius range from 0.002 μm to 1 μm/pore volume V2 derived from pores in the radius range from larger than 1 μm to 30 μm or smaller is 0.30 to 0.65.

19 Claims, 1 Drawing Sheet

(56) References Cited

U.S. PATENT DOCUMENTS

| | | |
|---|---|---|
| 2010/0029869 A1 | 2/2010 | Morini et al. |
| 2015/0240001 A1 | 8/2015 | Hosaka et al. |

FOREIGN PATENT DOCUMENTS

| | | |
|---|---|---|
| EP | 1283222 B1 | 7/2012 |
| JP | 3-62805 A | 3/1991 |
| JP | 6-41217 A | 2/1994 |
| JP | 6-65314 A | 3/1994 |
| JP | 6-220117 A | 8/1994 |
| JP | 7-300507 A | 11/1995 |
| JP | 8-20606 A | 1/1996 |
| JP | 10-60041 A | 3/1998 |
| JP | 2003-502487 A | 1/2003 |
| JP | 2003-105018 A | 4/2003 |
| JP | 2006-199975 A | 8/2006 |
| JP | 2007-106846 A | 4/2007 |
| JP | 2007-146065 A | 6/2007 |
| JP | 2008-74948 A | 4/2008 |
| JP | 2010-513625 A | 4/2010 |
| JP | 2012-158640 A | 8/2012 |
| KR | 10-2015-0064022 A | 6/2015 |
| RU | 2060999 C1 | 5/1996 |

OTHER PUBLICATIONS

Extended (Supplementary) European Search Report dated Aug. 6, 2020, issued in counterpart application No. 17858373.8. (9 pages).
International Search Report dated Jan. 9, 2018, issued in counterpart application No. PCT/JP2017/035911 (2 pages).
The first examination report dated Feb. 9, 2021, issued in counterpart Indian Application No. 201917017024. (6 pages).
Office Action dated Jun. 4, 2021, issued in counterpart Russian Application No. 2019111767/04(022830) (12 pages, w/ English translation).
Office Action dated Nov. 8, 2021, issued in counterpart Korean Application No. 10-2019-7011027 (15 pages, w/English translation).

* cited by examiner

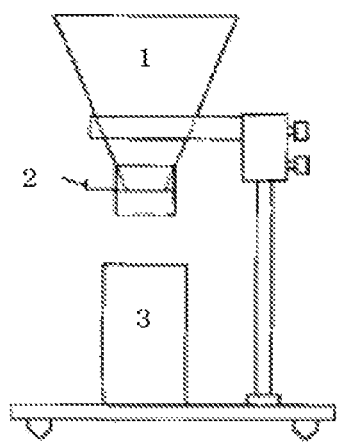

SOLID CATALYST COMPONENT FOR POLYMERIZATION OF OLEFINS, METHOD FOR PRODUCING SOLID CATALYST COMPONENT FOR POLYMERIZATION OF OLEFINS, CATALYST FOR POLYMERIZATION OF OLEFINS, METHOD FOR PRODUCING POLYMER OF OLEFIN, METHOD FOR PRODUCING POLYMER PROPYLENE COPOLYMER AND PROPYLENE COPOLYMER

TECHNICAL FIELD

The present invention relates to a solid catalyst component for polymerization of olefins, a method for producing a solid catalyst component for polymerization of olefins, a catalyst for polymerization of olefins, a method for producing a polymer of an olefin, a method for producing a propylene copolymer and a method for producing a propylene copolymer.

BACKGROUND ART

A large number of methods which involve polymerizing or copolymerizing olefins in the presence of a catalyst for polymerization of olefins consisting of a solid catalyst component containing magnesium, titanium and a halogen atom as essential components, and an organoaluminum compound have heretofore been proposed as polymerization methods for olefins by polymerizing or copolymerizing the olefins.

The control of the morphology (particle structure) of the solid catalyst component is important for obtaining polymers of olefins having desired characteristics. Thus, many studies have been made thereon.

For example, Patent Literature 1 (Japanese Patent Laid-Open No. 6-41217), Patent Literature 2 (Japanese Patent Laid-Open No. 6-65314), Patent Literature 3 (Japanese Patent Laid-Open No. 6-220117), Patent Literature 4 (Japanese Patent Laid-Open No. 7-300507), Patent Literature 5 (National Publication of International Patent Application No. 2003-502487) and Patent Literature 6 (National Publication of International Patent Application No. 2010-513625) disclose a method for polymerizing olefins in the presence of a catalyst for polymerization of olefins consisting of a solid catalyst component and an organoaluminum compound, the solid catalyst component being prepared by using an alcohol adduct of magnesium chloride having a controlled alcohol content, and further treating the alcohol adduct with titanium tetrachloride or alkyl aluminum, and propose that the solid catalyst component improves the molecular weight distribution or bulk density of an ethylene polymer, the morphological stability of a low-molecular-weight ethylene polymer, and the comonomer homogeneity of an ethylene-1-butene copolymer.

CITATION LIST

[Patent Literature 1] Japanese Patent Laid-Open No. 6-41217
[Patent Literature 2] Japanese Patent Laid-Open No. 6-65314
[Patent Literature 3] Japanese Patent Laid-Open No. 6-220117
[Patent Literature 4] Japanese Patent Laid-Open No. 7-300507
[Patent Literature 5] National Publication of International Patent Application No. 2003-502487
[Patent Literature 6] National Publication of International Patent Application No. 2010-513625

SUMMARY OF INVENTION

Technical Problem

As mentioned above, the control of the morphology of the solid catalyst component is important for polymerizing or copolymerizing ethylene as well as propylene as olefins. In this context, propylene and ethylene copolymers are used for a wide range of purposes. On the other hand, these copolymers are susceptible to stickiness during production as compared with propylene homopolymers and therefore adhere to the inside walls of polymerization reactors, piping, storage containers, and the like, easily causing a blockage, etc. Furthermore, this adhesion tends to incur reduction in the flowability or particle size distribution of the resulting propylene copolymer particles.

Examples of a method for solving the adhesion of polymers of olefins or a blockage, etc. in piping and the like associated with the adhesion during the polymerization or copolymerization of the olefins include a method which involves controlling the pore volume or pore size of a solid catalyst component, thereby improving the adherence, etc. of propylene copolymer particles.

Examples of a method for solving the reduction in the flowability or particle size distribution of propylene copolymer particles include a method which involves bringing a titanium halide compound into contact with dialkoxy magnesium containing an alcohol or brought into contact with an alcohol, and using the resulting solid catalyst component to obtain propylene copolymer particles, thereby suppressing the occurrence of a fine powder or a coarse powder and reducing a volatile organic component.

However, even the methods mentioned above cannot always suppress the stickiness (tackiness) of polymers of olefins and are not sufficiently satisfactory for producing propylene copolymer particles having high flowability and a favorable particle size distribution.

Examples of a method for improving the particle size distribution also include a method which involves performing ex-post fine powder removal treatment, followed by treatment with a surfactant. In this case, the process of producing the solid catalyst component is complicated, causing reduction in the productivity of the solid catalyst component such as reduction in yield.

Under these circumstances, an object of the present invention is to provide a solid catalyst component for polymerization of olefins which is capable of producing a polymer that has very low adherence ascribable to the stickiness (tackiness) of polymer particles, is excellent in flowability, and also has a favorable particle size distribution, in order to polymerize olefins, particularly, to perform the copolymerization, such as random copolymerization or block copolymerization, of propylene and ethylene, and to provide a method for producing a solid catalyst component for polymerization of olefins, a catalyst for polymerization of olefins and a method for producing a propylene copolymer.

Solution to Problem

As a result of conducting diligent studies to solve the technical problems described above, the present inventors have found that the technical problems can be solved by polymerizing or copolymerizing olefins using a solid catalyst component for polymerization of olefins, comprising titanium, magnesium, a halogen atom and an internal electron donor, wherein the solid catalyst component has a multimodal pore volume distribution measured by a mercury intrusion method and has one or more peak tops in each of a pore radius range from 0.002 μm to 1 μm and a pore radius range from larger than 1 μm to 30 μm or smaller, and a ratio represented by pore volume V1 derived from pores in the radius range from 0.002 μm to 1 μm/pore volume V2 derived from pores in the radius range from larger than 1 μm to 30 μm or smaller is 0.30 to 0.65. On the basis of this finding, the present invention has been completed.

Specifically, the present invention provides (1) a solid catalyst component for polymerization of olefins, comprising
titanium, magnesium, a halogen atom and an internal electron donor, wherein
the solid catalyst component has a multimodal pore volume distribution measured by a mercury intrusion method and has one or more peak tops in each of a pore radius range from 0.002 μm to 1 μm and a pore radius range from larger than 1 μm to 30 μm or smaller, and
a ratio represented by pore volume V1 derived from pores in the radius range from 0.002 μm to 1 μm/pore volume V2 derived from pores in the radius range from larger than 1 μm to 30 μm or smaller is 0.30 to 0.65, (2) the solid catalyst component for polymerization of olefins according to (1), wherein a total pore volume measured by the mercury intrusion method is 0.65 to 2.00 cm$^3$/g, (3) the solid catalyst component for polymerization of olefins according to (1), wherein the pore volume V1 derived from pores in the radius range from 0.002 μm to 1 μm is 0.1 to 0.8 cm$^3$/g, (4) the solid catalyst component for polymerization of olefins according to (1), wherein the pore volume V2 derived from pores in the radius range from larger than 1 μm to 30 μm or smaller is 0.3 to 1.5 cm$^3$/g, (5) the solid catalyst component for polymerization of olefins according to (1), wherein a specific surface area measured by a BET method is 1 to 500 m$^2$/g, (6) the solid catalyst component for polymerization of olefins according to (1), wherein the internal electron donor is one or more compounds selected from an ester compound, an ether compound and a carbonate compound, (7) a method for producing a solid catalyst component for polymerization of olefins according to (1), comprising the step of
bringing a magnesium compound having an alkoxy group, a titanium halide compound and an internal electron donor into contact with each other, wherein
for the contact between the magnesium compound having an alkoxy group and the titanium halide compound, the magnesium compound having an alkoxy group is added to the titanium halide compound or alternatively the titanium halide compound is added to the magnesium compound having an alkoxy group continuously or intermittently over 2 hours or longer while a temperature of 15° C. or lower is kept, (8) the method for producing a solid catalyst component for polymerization of olefins according to (7), wherein the magnesium compound having an alkoxy group is dialkoxy magnesium, (9) the method for producing a solid catalyst component for polymerization of olefins according to (7), wherein the magnesium compound having an alkoxy group has a spherical or ellipsoidal particle shape, has a multimodal pore volume distribution defined by the mercury intrusion method, and has one or more peak tops in each of a pore radius range from 0.002 μm to 1 μm and a pore radius range from larger than 1 μm to 30 μm or smaller,

(10) the method for producing a solid catalyst component for polymerization of olefins according to (7), wherein the magnesium compound having an alkoxy group has a total pore volume of 1.3 to 3.0 cm$^3$/g defined by the mercury intrusion method,

(11) the method for producing a solid catalyst component for polymerization of olefins according to (7), wherein the magnesium compound having an alkoxy group has a pore volume of 0.3 cm$^3$/g or larger derived from pores in a pore radius range from 0.002 μm to 1 μm, defined by the mercury intrusion method,

(12) the method for producing a solid catalyst component for polymerization of olefins according to (7), wherein the magnesium compound having an alkoxy group has a pore volume of 0.5 to 2.0 cm$^3$/g derived from pores in a pore radius range from larger than 1 μm to 30 μm or smaller, defined by the mercury intrusion method,

(13) the method for producing a solid catalyst component for polymerization of olefins according to (7), wherein the magnesium compound having an alkoxy group comprises 0.1 to 1.5 parts by mass of an alcohol per 100 parts by mass of the magnesium compound having an alkoxy group,

(14) the method for producing a solid catalyst component for polymerization of olefins according to (7), wherein in the step of bringing the magnesium compound having an alkoxy group and the titanium halide compound into contact with each other, the magnesium compound having an alkoxy group is added to the titanium halide compound continuously or intermittently over 2 hours or longer while a temperature of 15° C. or lower is kept,

(15) the method for producing a solid catalyst component for polymerization of olefins according to (7), wherein the internal electron donor is brought two or more times into contact with the magnesium compound having an alkoxy group, the titanium halide compound or a mixture of the magnesium compound having an alkoxy group and the titanium halide compound,

(16) a catalyst for polymerization of olefins, comprising a contact product of a solid catalyst component for polymerization of olefins according to (1), an organoaluminum compound represented by the following general formula (I):

$$R^1_p Al\, Q_{3-p} \qquad (I)$$

wherein $R^1$ is an alkyl group having 1 to 6 carbon atoms; Q is a hydrogen atom or a halogen atom; p is a real number of 0<p≤3; when a plurality of $R^1$ moieties are present, these $R^1$ moieties are the same as or different from each other; and when a plurality of Q moieties are present, these Q moieties are the same as or different from each other,
and an external electron-donating compound,

(17) the catalyst for polymerization of olefins according to (16), wherein the external electron-donating compound is at least one organosilicon compound selected from the following general formula (II):

$$R^2_q Si(OR^3)_{4-q} \qquad (II)$$

wherein $R^2$ is an alkyl group having 1 to 12 carbon atoms, a cycloalkyl group having 3 to 12 carbon atoms, a phenyl group, a vinyl group, an allyl group or an aralkyl group, and a plurality of $R^2$ moieties are the same or different; $R^3$ is an alkyl group having 1 to 4 carbon atoms, a cycloalkyl group having 3 to 6 carbon atoms, a phenyl group, an alkylamino group having 1 to 12 carbon atoms, a dialkylamino group having 1 to 12 carbon atoms, a vinyl group, an allyl group or an aralkyl group, and a plurality of $R^3$ moieties are the same or different; and q is an integer of $0 \leq q \leq 3$,
and the following general formula (III):

$$(R^4R^5N)_sSiR^6_{4-s} \qquad (III)$$

wherein $R^4$ and $R^5$ each are a hydrogen atom, a linear alkyl group having 1 to 20 carbon atoms, a branched alkyl group having 3 to 20 carbon atoms, a vinyl group, an allyl group, an aralkyl group, a cycloalkyl group having 3 to 20 carbon atoms or an aryl group and are the same or different, or $R^4$ and $R^5$ are optionally bonded to each other to form a ring; $R^6$ is a linear alkyl group having 1 to 20 carbon atoms, a branched alkyl group having 3 to 20 carbon atoms, a vinyl group, an allyl group, an aralkyl group, a cycloalkyl group having 3 to 20 carbon atoms or an aryl group; when a plurality of $R^6$ moieties are present, the plurality of $R^6$ moieties are the same or different; and s is an integer of 1 to 3,

(18) a method for producing a polymer of an olefin, comprising polymerizing the olefin in the presence of a catalyst for polymerization of olefins according to (16),

(19) a method for producing a propylene copolymer, comprising polymerizing propylene using a catalyst for polymerization of olefins according to (16), and subsequently copolymerizing two or more olefins,

(20) a propylene copolymer having a pore volume of 0.10 to 0.23 cm$^3$/g measured by a mercury intrusion method,

(21) the propylene copolymer according to (20), wherein the propylene copolymer is obtained by multistage polymerization having two or more stages, and a volume ratio of a pore volume of an olefin polymer obtained after polymerization at the second or later stage to a pore volume of a polymer obtained after polymerization at the first stage is in the range from 30 to 99%,

(22) the propylene copolymer according to (20), wherein the propylene copolymer has at least one peak top in a pore radius range from 0.1 μm to 40 μm in a pore volume distribution measured by a mercury intrusion method, and for at least one peak having the peak top, a ratio of a half width of the peak in the pore volume distribution to the pore radius of the peak top in the pore volume distribution is 2.0 or less, and

(23) the propylene copolymer according to (20), wherein the sum of pore volumes in a pore radius range from 1 to 20 μm is 0.09 to 0.21 cm$^3$/g.

Advantageous Effects of Invention

The present invention can provide a solid catalyst component for polymerization of olefins which is capable of producing a polymer that has very low adherence ascribable to the stickiness (tackiness) of polymer particles, is excellent in flowability, and also has a favorable particle size distribution, in order to polymerize olefins, particularly, to perform the copolymerization reaction, such as random copolymerization or block copolymerization, of propylene and ethylene, and can also provide a method for producing a solid catalyst component for polymerization of olefins, a catalyst for polymerization of olefins, a method for producing a polymer of an olefin, a method for producing a propylene copolymer and a propylene copolymer.

BRIEF DESCRIPTION OF DRAWING

FIG. 1 is a diagram schematically illustrating an apparatus for measuring the high-temperature powder flowability of propylene block copolymers used in Examples and Comparative Examples of the present invention.

DESCRIPTION OF EMBODIMENTS

The solid catalyst component for polymerization of olefins according to the present invention comprises titanium, magnesium, a halogen atom and an internal electron donor, wherein the solid catalyst component has a multimodal pore volume distribution measured by a mercury intrusion method and has one or more peak tops in each of a pore radius range from 0.002 μm to 1 μm and a pore radius range from larger than 1 μm to 30 μm or smaller, and a ratio represented by pore volume V1 derived from pores in the radius range from 0.002 μm to 1 μm/pore volume V2 derived from pores in the radius range from larger than 1 μm to 30 μm or smaller is 0.30 to 0.65.

The solid catalyst component for polymerization of olefins according to the present invention comprises titanium, magnesium, a halogen atom and an internal electron donor.

The titanium and the halogen atom are preferably derived from a titanium halide compound mentioned later.

Examples of the halogen atom can specifically include one or more atoms selected from a fluorine atom, a chlorine atom, a bromine atom and an iodine atom. The halogen atom is preferably one or more atoms selected from a chlorine atom, a bromine atom and an iodine atom, more preferably one or more atoms selected from a chlorine atom and an iodine atom.

The magnesium is preferably derived from a magnesium compound having an alkoxy group mentioned later.

The electron-donating compound is preferably an organic compound containing an oxygen atom or a nitrogen atom. Examples thereof can include one or more compounds selected from alcohols, phenols, acid halides, acid amides, nitriles, acid anhydride, ether compounds, organic acid esters, silicic acid esters, compounds having an ether group and an ester group, carbonic acid ester compounds having an ether group, aldehydes, ketones and carbonates. One or more compounds selected from esters, ethers and carbonates are preferred.

The internal electron donor is preferably ether compounds such as monoethers, diethers and ether carbonates, and esters such as monocarboxylic acid esters and polycarboxylic acid esters, more preferably one or more compounds selected from aromatic polycarboxylic acid esters such as aromatic dicarboxylic acid diester, aliphatic polycarboxylic acid esters, alicyclic polycarboxylic acid esters, diethers, and ether carbonates.

Examples of the electron-donating compound can specifically include one or more compounds selected from phthalic acid diesters such as diethyl phthalate and dibutyl phthalate, malonic acid diesters such as dimethyl malonate and diethyl malonate, hydrocarbon-substituted malonic acid diesters such as dimethyl diisobutylmalonate, diethyl diisobutylmalonate and diethyl benzylidenemalonate, maleic acid diesters such as diethyl maleate and di-n-butyl maleate, carbonic acid ester compounds having an ether group, such as (2-ethoxyethyl)methyl carbonate and (2-ethoxyethyl)methyl carbonate, cycloalkanedicarboxylic acid diesters such as dimethyl cyclohexane-1,2-dicarboxylate and 1,1-norbornyldicarboxylic acid diester, 2-isopropyl-2-isopentyl-1,3-dimethoxypropane, and 1,3-diethers such as 9,9-bis(methoxymethyl)fluorene.

The details of the electron-donating compound are as mentioned in the description of the method for producing a solid catalyst component for polymerization of olefins according to the present invention mentioned later.

In the solid catalyst component for polymerization of olefins according to the present invention, the composition of each component is not particularly limited as long as the object of the present invention can be attained.

The content of the magnesium (magnesium atom) in the solid catalyst component is preferably 10 to 40% by mass, more preferably 10 to 30% by mass, further preferably 13 to 25% by mass.

The content of the titanium (titanium atom) in the solid catalyst component is preferably 0.1 to 10% by mass, more preferably 0.5 to 8.0% by mass, further preferably 1.0 to 5.0% by mass.

The content of the halogen atom in the solid catalyst component is preferably 20 to 89% by mass, more preferably 30 to 85% by mass, further preferably 40 to 75% by mass.

The content of the internal electron donor in the solid catalyst component is preferably 0.5 to 40% by mass, more preferably 1 to 30% by mass, further preferably 2 to 25% by mass.

The solid catalyst component for polymerization of olefins according to the present invention may contain a reaction reagent containing silicon, phosphorus, or a metal such as aluminum, in addition to each component described above.

The reaction reagent is preferably one or more compounds selected from an organosilicon compound having a Si—O—C bond, an organosilicon compound having a Si—N—C bond, a phosphoric acid compound having a P—O bond, an organoaluminum compound (e.g., trialkyl aluminum, dialkoxy aluminum chloride, alkoxy aluminum dihalide and trialkoxy aluminum) and aluminum trihalide, etc., more preferably one or more compounds selected from an organosilicon compound having a Si—O—C bond, an organosilicon compound having a Si—N—C bond and an organoaluminum compound.

The solid catalyst component containing such a reaction reagent can easily improve polymerization activity or stereoregularity when subjected to the polymerization of propylene or propylene with an additional olefin.

The average particle size of the solid catalyst component for polymerization of olefins according to the present invention is preferably 1 to 100 μm, more preferably 10 to 70 μm.

In the present application, the average particle size of the solid catalyst component for polymerization of olefins means average particle size D50 (50% particle size in terms of an integrated particle size in a volume-integrated particle size distribution) when measured using a laser light scattering-diffraction particle size measurement machine.

The solid catalyst component for polymerization of olefins according to the present invention has a multimodal pore volume distribution measured by a mercury intrusion method and has one or more peak tops in each of a pore radius range from 0.002 μm to 1 μm and a pore radius range from larger than 1 μm to 30 μm or smaller.

The solid catalyst component for polymerization of olefins according to the present invention has one or more peak tops in a pore radius range from 0.002 μm to 1 μm, preferably one or more peak tops in a pore radius range from 0.01 μm to 0.5 μm, more preferably one or more peak tops in a pore radius range from 0.03 μm to 0.3 μm.

The solid catalyst component for polymerization of olefins according to the present invention preferably has 1 to 4 peak tops, more preferably 1 to 3 peak tops, further preferably 1 or 2 peak tops, in the pore radius range from 0.002 μm to 1 μm.

The solid catalyst component for polymerization of olefins according to the present invention has one or more peak tops in a pore radius range from larger than 1 μm to 30 μm or smaller, preferably one or more peak tops in a pore radius range from 2 μm to 15 μm, more preferably one or more peak tops in a pore radius range from 3 μm to 10 μm.

The solid catalyst component for polymerization of olefins according to the present invention preferably has 1 to 3 peak tops, more preferably 1 or 2 peak tops, further preferably 1 peak top, in the pore radius range from larger than 1 μm to 30 μm or smaller.

In the present application, the pore distribution of the solid catalyst component for polymerization of olefins means a distribution measured by the mercury intrusion method using a mercury intrusion porosimeter (manufactured by Micromeritics Instrument Corp., AutoPore III 9420).

In the solid catalyst component for polymerization of olefins according to the present invention, the presence of pores with a small opening size included in a peak of which top in the pore radius range from 0.002 μm to 1 μm is considered to yield a polymerization product in which a copolymer having high adherence is finely dispersed inside polymer particles. Also, the presence of pores with a large opening size included in a peak of which top in the pore radius range from larger than 1 μm to 30 μm or smaller is considered to be able to maintain a large amount of a copolymer that cannot remain in the pores with a small opening size, or a copolymer having stickiness inside polymer particles. Hence, the adherence of polymer particles ascribable to the stickiness (tackiness) of copolymer particles can probably be reduced.

More specifically, the solid catalyst component for polymerization of olefins according to the present invention, which has both the pores with a small opening size and the pores with a large opening size mentioned above, when used in, for example, propylene-ethylene block copolymerization reaction, is considered to produce an ethylene-propylene copolymer, a rubber component, with a very small particle size and in a form finely dispersed in propylene polymer particles in the neighborhood of the propylene polymer particles (or in matrix) in an ethylene-propylene copolymerization step following a propylene polymerization step. Furthermore, as the proportion of the rubber component is elevated, the propylene polymer particles are further fragmented so that the rubber component is produced in the gaps thereof (between the fragmented propylene polymer particles). Thus, the rubber component, even if moving after polymerization, is considered to remain inside the polymer particles and be less likely to move to polymer particle surface. Therefore, a propylene block copolymer containing the rubber component at a very high proportion can probably be produced while the adherence of polymer particles ascribable to the stickiness (tackiness) of copolymer particles is reduced.

In the solid catalyst component for polymerization of olefins according to the present invention, the total pore volume of pores having a radius of 0.002 μm to 30 μm is preferably 0.65 to 2.0 cm$^3$/g, more preferably 0.70 to 1.5 cm$^3$/g, further preferably 0.75 to 1.2 cm$^3$/g.

In the solid catalyst component for polymerization of olefins according to the present invention, the pore volume V1 derived from pores in the radius range from 0.002 μm to 1 μm is preferably 0.1 to 0.8 cm$^3$/g, more preferably 0.15 to 0.45 cm$^3$/g, further preferably 0.20 to 0.40 cm$^3$/g, still further preferably 0.20 to 0.35 cm$^3$/g.

In the solid catalyst component for polymerization of olefins according to the present invention, the pore volume V2 derived from pores in the radius range from larger than 1 µm to 30 µm or smaller is preferably 0.3 to 1.5 cm$^3$/g, more preferably 0.4 to 1.2 cm$^3$/g, further preferably 0.5 to 0.9 cm$^3$/g.

In the solid catalyst component for polymerization of olefins according to the present invention, a ratio (V1/V2) represented by pore volume V1 derived from pores in the radius range from 0.002 µm to 1 µm/pore volume V2 derived from pores in the radius range from larger than 1 µm to 30 µm or smaller is 0.30 to 0.65, preferably 0.30 to 0.60, more preferably 0.30 to 0.55.

The solid catalyst component for polymerization of olefins according to the present invention has pores with a small opening size having a peak top in the pore radius range from 0.002 µm to 1 µm, and pores with a large opening size having a peak top in the pore radius range from larger than 1 µm to 30 µm or smaller, in the range of the pore volume ratio described above and is thereby probably capable of effectively reducing the adherence of polymer particles ascribable to the stickiness (tackiness) of copolymer particles.

In the present application, all the total pore volume, the pore volume V1 and the pore volume V2 mean values measured by the mercury intrusion method using a mercury intrusion porosimeter (manufactured by Micromeritics Instrument Corp., AutoPore III 9420).

In the solid catalyst component for polymerization of olefins according to the present invention, the specific surface area measured by a BET method is preferably 1 to 500 m$^2$/g, more preferably 10 to 500 m$^2$/g, further preferably 30 to 400 m$^2$/g, still further preferably 100 to 400 m$^2$/g.

In the present application, the specific surface area means a value automatically measured by the BET method using a specific surface area measurement machine (manufactured by Quantachrome Corp., QUANTASORB QS-17).

When the specific surface area measured by the BET method, of the solid catalyst component for polymerization of olefins according to the present invention falls within the range described above, the resulting polymer also has moderate irregularities on the surface. Thus, the adherence of the resulting polymer can be effectively reduced.

The present invention can provide a solid catalyst component for polymerization of olefins which is capable of producing a polymer that has very low adherence ascribable to the stickiness (tackiness) of polymer particles, is excellent in flowability, and also has a favorable particle size distribution, in order to polymerize olefins, particularly, to perform the copolymerization, such as random copolymerization or block copolymerization, of propylene and ethylene.

Next, the method for producing a solid catalyst component for polymerization of olefins according to the present invention will be described.

The method for producing a solid catalyst component for polymerization of olefins according to the present invention is a method for producing the solid catalyst component for polymerization of olefins according to the present invention, comprising the step of bringing a magnesium compound having an alkoxy group, a titanium halide compound and an internal electron donor into contact with each other, wherein for the contact between the magnesium compound having an alkoxy group and the titanium halide compound, the magnesium compound having an alkoxy group is added to the titanium halide compound or alternatively the titanium halide compound is added to the magnesium compound having an alkoxy group continuously or intermittently over 2 hours or longer while a temperature of 15° C. or lower is kept.

In the method for producing a solid catalyst component for polymerization of olefins according to the present invention, the magnesium compound having an alkoxy group is preferably dialkoxy magnesium.

Examples of the dialkoxy magnesium can include one or more compounds selected from diethoxy magnesium, dipropoxy magnesium, dibutoxy magnesium, dipentoxy magnesium, diisooctoxy magnesium, ethoxybutoxy magnesium and ethoxyisooctoxy magnesium. Diethoxy magnesium is preferred.

The dialkoxy magnesium may be used alone or in combination of two or more thereof.

In the method for producing a solid catalyst component for polymerization of olefins according to the present invention, secondary particles of the magnesium compound having an alkoxy group are in a granular or powdery form in a dry state. The shape thereof is usually a spherical shape, but is not necessarily required to be a true spherical shape and may be an ellipsoidal shape.

Specifically, the ratio (l/w) of length l to width w of the secondary particles of the magnesium compound having an alkoxy group is preferably 3 or less, more preferably 1 to 2, further preferably 1 to 1.5.

In the method for producing a solid catalyst component for polymerization of olefins according to the present invention, the magnesium compound having an alkoxy group preferably has a multimodal pore volume distribution defined by the mercury intrusion method and has one or more peak tops in each of a pore radius range from 0.002 µm to 1 µm and a pore radius range from larger than 1 µm to 30 µm or smaller.

The magnesium compound having an alkoxy group has one or more peak tops in a pore radius range from 0.002 µm to 1 µm, preferably one or more peak tops in a pore radius range from 0.01 µm to 0.5 µm, more preferably one or more peak tops in a pore radius range from 0.03 µm to 0.3 µm.

The magnesium compound having an alkoxy group preferably has 1 to 4 peak tops, more preferably 1 to 3 peak tops, further preferably 1 or 2 peak tops, in the pore radius range from 0.002 µm to 1 µm.

The magnesium compound having an alkoxy group has one or more peak tops in a pore radius range from larger than 1 µm to 30 µm or smaller, preferably one or more peak tops in a pore radius range from 2 µm to 15 µm, more preferably one or more peak tops in a pore radius range from 3 µm to 10 µm.

The magnesium compound having an alkoxy group preferably has 1 to 3 peak tops, more preferably 1 or 2 peak tops, further preferably 1 peak top, in the pore radius range from larger than 1 µm to 30 µm or smaller.

In the present application, the pore distribution of the magnesium compound having an alkoxy group means a distribution measured by the mercury intrusion method using a mercury intrusion porosimeter (manufactured by Micromeritics Instrument Corp., AutoPore III 9420).

The magnesium compound having an alkoxy group functions as a support for the resulting solid catalyst component for polymerization of olefins. The magnesium compound having an alkoxy group, which has a multimodal pore volume distribution defined by the mercury intrusion method and has one or more peak tops in each of a pore radius range from 0.002 µm to 1 µm and a pore radius range from larger than 1 μm to 30 μm or smaller, can easily yield a solid catalyst component for polymerization of olefins having the same pore distribution as above.

In the method for producing a solid catalyst component for polymerization of olefins according to the present invention, the total pore volume of pores having a radius of 0.002 μm to 30 μm in the magnesium compound having an alkoxy group is preferably 1.3 to 3.0 cm³/g, more preferably 1.4 to 2.5 cm³/g, further preferably 1.5 to 2.2 cm³/g.

In the magnesium compound having an alkoxy group, the pore volume derived from pores having a radius of 0.002 μm to 1 μm is preferably 0.3 cm³/g or larger, more preferably 0.4 to 1.0 cm³/g, further preferably 0.5 to 0.9 cm³/g.

In the magnesium compound having an alkoxy group, the pore volume derived from pores having a radius of larger than 1 μm to 30 μm or smaller is preferably 0.5 to 2.0 cm³/g, more preferably 0.6 to 1.8 cm³/g, further preferably 0.7 to 1.6 cm³/g, still further preferably 0.8 to 1.5 cm³/g.

In the present application, all the total pore volume, the pore volume derived from pores in the radius range from 0.002 μm to 1 μm, and the pore volume derived from pores in the radius range from larger than 1 μm to 30 μm or smaller in the magnesium compound having an alkoxy group mean values measured by the mercury intrusion method using a mercury intrusion porosimeter (manufactured by Micromeritics Instrument Corp., AutoPore III 9420).

In the method for producing a solid catalyst component for polymerization of olefins according to the present invention, the magnesium compound having an alkoxy group may contain an alcohol in the inside. In this case, the magnesium compound having an alkoxy group preferably contains 0.1 to 1.5 parts by mass of the alcohol, more preferably 0.2 to 1.2 parts by mass of the alcohol, further preferably 0.4 to 1.0 parts by mass of the alcohol, per 100 parts by mass thereof.

In the method for producing a solid catalyst component for polymerization of olefins according to the present invention, the bulk specific gravity of the magnesium compound having an alkoxy group is preferably 0.1 to 0.6 g/ml, more preferably 0.2 to 0.5 g/ml, further preferably 0.25 to 0.40 g/ml.

In the method for producing a solid catalyst component for polymerization of olefins according to the present invention, examples of the titanium halide compound can include one or more compounds selected from titanium halide and alkoxy titanium halide, for example, a tetravalent titanium compound represented by the following general formula (IV):

$$TiY_i(OR^7)_{4-i} \quad (IV)$$

wherein Y is a halogen atom; $R^7$ is a linear or branched alkyl group having 1 to 7 carbon atoms; i is an integer of 1 to 4; when a plurality of $R^7$ moieties are present, these $R^1$ moieties are the same as or different from each other; and when a plurality of Y moieties are present, these Y moieties are the same as or different from each other.

In the titanium compound represented by the general formula (IV), examples of the halogen atom X include a fluorine atom, a chlorine atom, a bromine atom and an iodine atom.

In the titanium compound represented by the general formula (IV), $R^7$ is a linear or branched alkyl group having 1 to 7 carbon atoms, preferably an alkyl group having 1 to 5 carbon atoms, more preferably an alkyl group having 1 to 4 carbon atoms.

In the titanium compound represented by the general formula (IV), specific examples of $R^7$ can include a methyl group, an ethyl group, a n-propyl group, an isopropyl group, a n-butyl group, an isobutyl group, a t-butyl group, a n-pentyl group, an isopentyl group, a neopentyl group, a n-hexyl group and an isohexyl group.

Examples of the titanium compound represented by the general formula (IV) specifically include titanium tetrahalides such as titanium tetrachloride, titanium tetrabromide and titanium tetraiodide, and alkoxy titanium halides such as methoxy titanium trichloride, ethoxy titanium trichloride, propoxy titanium trichloride, butoxy titanium trichloride, dimethoxy titanium dichloride, diethoxy titanium dichloride, dipropoxy titanium dichloride, dibutoxy titanium dichloride, trimethoxy titanium chloride, ethoxy titanium trichloride, tripropoxy titanium chloride and tributoxy titanium chloride.

The titanium compound represented by the general formula (IV) is preferably titanium tetrahalide, particularly preferably titanium tetrachloride.

In the titanium compound represented by the general formula (IV), i is an integer of 1 to 4, preferably 2 to 4.

The titanium compound represented by the general formula (IV) may be used alone or in combination of two or more thereof.

The titanium compound represented by the general formula (IV) may be diluted with a hydrocarbon compound or a halogenated hydrocarbon compound.

In the method for producing a solid catalyst component for polymerization of olefins according to the present invention, the electron-donating compound is preferably an organic compound containing an oxygen atom or a nitrogen atom. Examples thereof can include one or more compounds selected from alcohols, phenols, acid halides, acid amides, nitriles, acid anhydride, ether compounds, organic acid esters, silicic acid esters, compounds having an ether group and an ester group, carbonic acid ester compounds having an ether group, aldehydes, ketones and carbonates. One or more compounds selected from esters, ethers and carbonates are preferred.

The internal electron donor is preferably ether compounds such as monoethers, diethers and ether carbonates, and esters such as monocarboxylic acid esters and polycarboxylic acid esters, more preferably one or more compounds selected from aromatic polycarboxylic acid esters such as aromatic dicarboxylic acid diester, aliphatic polycarboxylic acid esters, alicyclic polycarboxylic acid esters, diethers, and ether carbonates.

Examples of the electron-donating compound can include phthalic acid esters, malonic acid esters, succinic acid esters, diethers, cycloalkanecarboxylic acid esters, cycloalkenecarboxylic acid esters, carbonate ethers and 1,3-diethers and can specifically include one or more compounds selected from phthalic acid diesters such as diethyl phthalate and dibutyl phthalate, malonic acid diesters such as dimethyl malonate and diethyl malonate, hydrocarbon-substituted malonic acid diesters such as dimethyl diisobutylmalonate, diethyl diisobutylmalonate and diethyl benzylidenemalonate, maleic acid diesters such as diethyl maleate and di-n-butyl maleate, carbonic acid ester compounds having an ether group, such as (2-ethoxyethyl)methyl carbonate and (2-ethoxyethyl)methyl carbonate, cycloalkanedicarboxylic acid diesters such as dimethyl cyclohexane-1,2-dicarboxylate and 1,1-norbornyldicarboxylic acid diester, cycloalkenedicarboxylic acid diesters such as di-n-butyl 1-cyclohexene-1,2-dicarboxylate, carbonate ethers such as 2-ethoxyethyl-1-phenyl carbonate, 1,3-diethers such as 9,9-bis(methoxymethyl)fluorene, and 2-isopropyl-2-isopentyl-1,3-dimethoxypropane.

The method for producing a solid catalyst component for polymerization of olefins according to the present invention comprises the step of bringing the magnesium compound having an alkoxy group, the titanium halide compound and the internal electron donor into contact with each other, wherein for the contact between the magnesium compound having an alkoxy group and the titanium halide compound, the magnesium compound having an alkoxy group is added to the titanium halide compound or alternatively the titanium halide compound is added to the magnesium compound having an alkoxy group continuously or intermittently over 2 hours or longer while a temperature of 15° C. or lower is kept.

In the method for producing a solid catalyst component for polymerization of olefins according to the present invention, it is preferred that the magnesium compound having an alkoxy group should be added to the titanium halide compound continuously or intermittently over 2 hours or longer while a temperature of 15° C. or lower is kept.

In the method for producing a solid catalyst component for polymerization of olefins according to the present invention, the magnesium compound having an alkoxy group may contain an alcohol for the contact of the magnesium compound having an alkoxy group, the titanium halide compound and the internal electron donor. The magnesium compound having an alkoxy group, which contains an alcohol can further increase the pore volume of the resulting solid catalyst component.

In the method for producing a solid catalyst component for polymerization of olefins according to the present invention, the magnesium compound having an alkoxy group, the titanium halide compound and the internal electron donor may be brought into contact in the presence of an inert organic solvent.

In this case, examples of the inert organic solvent can include, but are not particularly limited to, one or more solvents selected from saturated hydrocarbon compounds such as pentane, hexane, heptane, octane, nonane, decane, cyclohexane, methylcyclohexane, ethylcyclohexane, 1,2-diethylcyclohexane, methylcyclohexene, decalin and mineral oil, aromatic hydrocarbon compounds such as benzene, toluene, xylene and ethylbenzene, and halogenated hydrocarbon compounds such as o-dichlorobenzene, methylene chloride, 1,2-dichlorobenzene, carbon tetrachloride and dichloroethane.

A saturated hydrocarbon compound or an aromatic hydrocarbon compound that has a boiling point on the order of 50 to 200° C. and is liquid at ordinary temperature is preferably used as the inert organic solvent. Among them, one or more solvents selected from hexane, heptane, octane, ethylcyclohexane, mineral oil, toluene, xylene and ethylbenzene are preferred, and any one or more solvents selected from hexane, heptane, ethylcyclohexane and toluene are more preferred.

In the method for producing a solid catalyst component for polymerization of olefins according to the present invention, in the case of bringing the magnesium compound having an alkoxy group, the titanium halide compound and the internal electron donor into contact with each other, (i) the magnesium compound having an alkoxy group may be added to the titanium halide compound continuously or intermittently, followed by the addition of the internal electron donor to the obtained mixture, and (ii) the titanium halide compound may be added to the magnesium compound having an alkoxy group continuously or intermittently, followed by the addition of the internal electron donor to the obtained mixture.

Furthermore, (iii) the magnesium compound having an alkoxy group and the internal electron donor may be added to the titanium halide compound continuously or intermittently, and (iv) the titanium halide compound and the internal electron donor may be added to the magnesium compound having an alkoxy group continuously or intermittently.

Moreover, (v) a portion of the internal electron donor may be added to the magnesium compound having an alkoxy group, and subsequently, after contact of the mixture with the titanium halide compound, the remaining portion of the internal electron donor may be added thereto. In such a case of adding the internal electron donor in divided portions before and after the contact between the magnesium compound having an alkoxy group and the titanium halide compound, a solid catalyst component having a large pore volume can be easily obtained.

In the method for producing a solid catalyst component for polymerization of olefins according to the present invention, the internal electron donor may be added continuously or may be added intermittently in small divided portions.

In the case of adding the internal electron donor intermittently in small divided portions after the contact between the magnesium compound having an alkoxy group and the titanium halide compound, i.e., in the case of bringing the internal electron donor two or more times into contact with a mixture of the magnesium compound having an alkoxy group and the titanium halide compound, the number of times of contact of the internal electron donor is preferably 2 to 8, more preferably 2 to 6, further preferably 2 to 4.

In the method for producing a solid catalyst component for polymerization of olefins according to the present invention, preferred examples of the mode of the contact of the magnesium compound having an alkoxy group, the titanium halide compound and the internal electron compound can include modes (1) to (4) given below.

In the method for producing a solid catalyst component for polymerization of olefins according to the present invention, the contact may be performed, for example, in the presence of an additional reaction reagent such as silicon, phosphorus or aluminum, or a surfactant.

(1) A method for preparing the solid catalyst component for polymerization of olefins according to the present invention, comprising suspending the magnesium compound having an alkoxy group in a hydrocarbon solvent, then bringing the suspension into contact with the titanium halide compound, subsequently warming the mixture, bringing the resultant into contact with the internal electron donor to obtain a solid product, washing the solid product with a hydrocarbon solvent, and then bringing the solid product into contact again with the titanium halide compound in the presence of a hydrocarbon solvent.

In this operation, the solid component can also be heat-treated in the presence or absence of a hydrocarbon solvent.

(2) A method for obtaining the solid catalyst component for polymerization of olefins according to the present invention, comprising suspending the magnesium compound having an alkoxy group in a hydrocarbon solvent, then subjecting the suspension to contact reaction with the titanium halide compound and the internal electron donor sequentially or simultaneously to obtain a solid product, washing the solid product with an inert organic solvent, and then bringing the solid product into contact again with the titanium halide compound for reaction in the presence of a hydrocarbon solvent.

In this operation, the solid component and the titanium halide compound can also be brought two or more times into contact.

(3) A method for obtaining the solid catalyst component for polymerization of olefins according to the present invention, comprising suspending the magnesium compound having an alkoxy group and the internal electron donor in a hydrocarbon solvent, reacting the obtained suspension by contact with the titanium halide compound to obtain a solid product, washing the solid product with a hydrocarbon solvent, and then further bringing the solid product into contact with the titanium halide compound in the presence of a hydrocarbon solvent.

(4) A method for preparing the solid catalyst component for polymerization of olefins according to the present invention, comprising suspending the magnesium compound having an alkoxy group in a hydrocarbon solvent, bringing the suspension into contact with the titanium halide compound, then warming the mixture, subjecting the resultant to contact reaction with the internal electron donor to obtain a solid product, washing the solid product with a hydrocarbon solvent, and then bringing the solid product into contact again with the titanium halide compound in the presence of a hydrocarbon solvent to prepare a solid catalyst component, wherein at any stage of the suspension, the contact and the contact reaction, aluminum chloride is brought into contact.

For the obtained product, it is preferred to prepare a solid catalyst component in a powdery form by removing a residual solvent until the mass ratio is ⅓ or less, preferably 1/20 to 1/6, to the solid catalyst component, and to remove a fine powder with a particle size of 11 μm or smaller mixed in the solid catalyst component powder by an approach such as air flow classification.

In the method for producing a solid catalyst component for polymerization of olefins according to the present invention, for the contact between the magnesium compound having an alkoxy group and the titanium halide compound, the magnesium compound having an alkoxy group is added to the titanium halide compound or alternatively the titanium halide compound is added to the magnesium compound having an alkoxy group continuously or intermittently over 2 hours or longer while a temperature of 15° C. or lower is kept.

The temperature (contact temperature) at the time of the addition of the magnesium compound having an alkoxy group or the titanium halide compound is 15° C. or lower, preferably 10° C. or lower, more preferably 5° C. or lower. The lower limit of the addition temperature (contact temperature) is not particularly limited and is usually −20° C. or higher.

If the temperature (contact temperature) at the time of the addition is higher than 15° C., the balance between the pore volume and bulk specific gravity of the resulting solid catalyst component for polymerization of olefins tends to be reduced, and the amount of a fine powder in the resulting solid catalyst component tends to be increased.

The addition time of the magnesium compound having an alkoxy group or the titanium halide compound is 2 hours or longer, preferably 2.5 hours or longer, more preferably 3 hours or longer. The upper limit of the addition time is not particularly limited and is usually 10 hours or shorter.

If the addition time is shorter than 2 hours, the pore volume of the resulting solid catalyst component for polymerization of olefins is too small, and the amount of a coarse powder in the resulting solid catalyst component tends to be increased. In addition, the particle size distribution tends to be deteriorated, and the bulk specific gravity tends to be small.

In the case of adding the magnesium compound having an alkoxy group to the titanium halide compound or alternatively adding the titanium halide compound to the magnesium compound having an alkoxy group intermittently, the addition time means the total time for which the magnesium compound having an alkoxy group and the titanium halide compound, respectively, is actually added.

The amount of each component used for preparing the solid catalyst component for polymerization of olefins differs depending on a preparation method and therefore cannot be generalized. For example, the amount of the titanium halide compound used is preferably 0.5 to 100 mol, more preferably 0.5 to 50 mol, further preferably 1 to 10 mol, per mol of the magnesium compound having an alkoxy group. The total amount of the internal electron donor and the magnesium compound having an alkoxy group, used is preferably 0.01 to 10 mol, more preferably 0.01 to 1 mol, further preferably 0.02 to 0.6 mol, per mol of the magnesium compound having an alkoxy group. The amount of the solvent used is preferably 0.001 to 500 mol, more preferably 0.001 to 100 mol, further preferably 0.005 to 10 mol, per mol of the magnesium compound having an alkoxy group.

The present invention can provide a method for conveniently producing a solid catalyst component for polymerization of olefins which is capable of producing a polymer that has very low adherence ascribable to the stickiness (tackiness) of polymer particles, is excellent in flowability, and also has a favorable particle size distribution, in order to polymerize olefins, particularly, to perform the copolymerization, such as random copolymerization or block copolymerization, of propylene and ethylene.

Next, the catalyst for polymerization of olefins according to the present invention will be described.

The catalyst for polymerization of olefins according to the present invention comprises a contact product of the solid catalyst component for polymerization of olefins according to the present invention, an organoaluminum compound represented by the following general formula (I):

$$R^1_p Al\, Q_{3-p} \qquad (I)$$

wherein $R^1$ is an alkyl group having 1 to 6 carbon atoms; Q is a hydrogen atom or a halogen atom; p is a real number of $0 < p \le 3$; when a plurality of $R^1$ moieties are present, these $R^1$ moieties are the same as or different from each other; and when a plurality of Q moieties are present, these Q moieties are the same as or different from each other, and an external electron-donating compound.

The organoaluminum compound represented by the general formula (I) is not particularly limited. Examples of $R^1$ can include one or more moieties selected from an ethyl group and an isobutyl group. Examples of Q can include one or more moieties selected from a hydrogen atom, a chlorine atom and a bromine atom. p is preferably 2, 2.5 or 3, particularly preferably 3.

Specific examples of such an organoaluminum compound can include one or more compounds selected from trialkyl aluminums such as triethyl aluminum, triisopropyl aluminum, tri-n-butyl aluminum and triisobutyl aluminum, alkyl aluminum halides such as diethyl aluminum chloride and diethyl aluminum bromide, and diethyl aluminum hydride. Among them, one or more compounds selected from alkyl aluminum halides such as diethyl aluminum chloride, trialkyl aluminums such as triethyl aluminum, tri-n-butyl aluminum and triisobutyl aluminum, and the like are preferred, and one or more compounds selected from triethyl aluminum and triisobutyl aluminum are more preferred.

In the catalyst for polymerization of olefins according to the present invention, the external electron-donating compound is preferably a compound containing an oxygen atom or a nitrogen atom among external electron-donating compounds known in the art.

In the catalyst for polymerization of olefins according to the present invention, examples of the external electron-donating compound can include one or more compounds selected from organosilicon compounds represented by the following general formula (II):

$$R^2_q Si(OR^3)_{4-q} \qquad (II)$$

wherein $R^2$ is an alkyl group having 1 to 12 carbon atoms, a cycloalkyl group having 3 to 12 carbon atoms, a phenyl group, a vinyl group, an allyl group or an aralkyl group, and a plurality of $R^2$ moieties are the same or different; $R^3$ is an alkyl group having 1 to 4 carbon atoms, a cycloalkyl group having 3 to 6 carbon atoms, a phenyl group, an alkylamino group having 1 to 12 carbon atoms, a dialkylamino group having 1 to 12 carbon atoms, a vinyl group, an allyl group or an aralkyl group, and a plurality of $R^3$ moieties are the same or different; and q is an integer of $0 \leq q \leq 3$.

Examples of the organosilicon compound can include phenylalkoxysilane, alkylalkoxysilane, phenyl(alkyl)alkoxysilane, cycloalkylalkoxysilane, cycloalkyl(alkyl)alkoxysilane, (alkylamino)alkoxysilane, alkyl(alkylamino)alkoxysilane, alkyl(dialkylamino)alkoxysilane, cycloalkyl (alkylamino)alkoxysilane and (polycyclic amino) alkoxysilane. Among others, the organosilicon compound is preferably one or more compounds selected from di-n-propyldimethoxysilane, diisopropyldimethoxysilane, di-n-butyldimethoxysilane, diisobutyldimethoxysilane, di-t-butyldimethoxysilane, di-n-butyldiethoxysilane, t-butyltrimethoxysilane, dicyclohexyldimethoxysilane, dicyclohexyldiethoxysilane, cyclohexylmethyldimethoxysilane, cyclohexylmethyldiethoxysilane, cyclohexylethyldimethoxysilane, cyclohexylethyldiethoxysilane, dicyclopentyldimethoxysilane, dicyclopentyldiethoxysilane, cyclopentylmethyldimethoxysilane, cyclopentylmethyldiethoxysilane, cyclopentylethyldiethoxysilane, cyclohexylcyclopentyldimethoxysilane, cyclohexylcyclopentyldiethoxysilane, 3-methylcyclohexylcyclopentyldimethoxysilane, 4-methylcyclohexylcyclopentyldimethoxysilane, 3,5-dimethylcyclohexyl(cyclopentyl)dimethoxysilane, diethylaminotriethoxysilane, bis(cyclohexylamino)dimethoxysilane, bis (perhydroisoquinolino)dimethoxysilane, bis (perhydroquinolino)dimethoxysilane and ethyl (isoquinolino)dimethoxysilane.

In the catalyst for polymerization of olefins according to the present invention, examples of the external electron-donating compound can include one or more compounds selected from organosilicon compounds (aminosilane compounds) represented by the following general formula (III):

$$(R^4 R^5 N)_s SiR^6_{4-s} \qquad (III)$$

wherein $R^4$ and $R^5$ each are a hydrogen atom, a linear alkyl group having 1 to 20 carbon atoms, a branched alkyl group having 3 to 20 carbon atoms, a vinyl group, an allyl group, an aralkyl group, a cycloalkyl group having 3 to 20 carbon atoms or an aryl group and are the same or different, or $R^4$ and $R^5$ are optionally bonded to each other to form a ring; $R^6$ is a linear alkyl group having 1 to 20 carbon atoms, a branched alkyl group having 3 to 20 carbon atoms, a vinyl group, an allyl group, an aralkyl group, a cycloalkyl group having 3 to 20 carbon atoms or an aryl group; when a plurality of $R^6$ moieties are present, the plurality of $R^6$ moieties are the same or different; and s is an integer of 1 to 3.

Examples of the organosilicon compound can include alkyltris(alkylamino)silane, dialkylbis(alkylamino)silane and trialkyl(alkylamino)silane and can specifically include one or more compounds selected from bis(ethylamino) methylethylsilane, t-butylmethylbis(ethylamino)silane, bis (ethylamino)dicyclohexylsilane, dicyclopentylbis(ethylamino)silane and bis(methylamino) (methylcyclopentylamino) methylsilane. Among them, one or more compounds selected from t-butylmethylbis(ethylamino)silane, bis(ethylamino)dicyclohexylsilane, dicyclopentylbis(ethylamino)silane, and the like are preferred.

In the catalyst for polymerization of olefins according to the present invention, one or more compounds selected from organosilicon compounds represented by the general formula (II) and the general formula (III) may be used as the external electron-donating compound.

A polymer of an olefin can be obtained by polymerizing the olefin in the presence of the catalyst for polymerization of olefins according to the present invention.

The polymerization of an olefin may be homopolymerization or may be copolymerization.

Examples of the olefin to be subjected to the polymerization can include one or more olefins selected from ethylene, propylene, 1-butene, 1-pentene, 4-methyl-1-pentene and vinylcyclohexane. The olefin is preferably one or more olefins selected from ethylene, propylene and 1-butene, more preferably ethylene and propylene.

In the case of performing copolymerization with an additional olefin for the polymerization of propylene using the catalyst for polymerization of olefins according to the present invention, examples of the olefin for use in the copolymerization with propylene can include one or more olefins selected from ethylene, 1-butene, 1-pentene, 4-methyl-1-pentene and vinylcyclohexane. Ethylene or 1-butene is preferred.

In the case of polymerizing (homopolymerizing or copolymerizing) an olefin using the catalyst for polymerization of olefins according to the present invention, the ratio of the amount of each component used to constitute the catalyst for polymerization of olefins is arbitrary without influencing the effect of the present invention and is not particularly limited. The organoaluminum compound represented by the general formula (I) is used in the range from 1 to 2000 mol, preferably 50 to 1000 mol, per mol of a titanium atom in the solid catalyst component for polymerization of olefins. The external electron-donating compound is used in the range from 0.002 to 10 mol, preferably 0.01 to 2 mol, particularly preferably 0.01 to 0.5 mol, per mol of the organoaluminum compound represented by the general formula (I).

The order of contact of each component described above is arbitrary. It is desirable to first charge the organoaluminum compound represented by the general formula (I) into a polymerization system, subsequently bring the external electron-donating compound into contact, and further bring the solid catalyst component for polymerization of olefins into contact. The polymerization of an olefin can be performed in the presence or absence of an organic solvent. An olefin monomer such as propylene can be used in any state of a gas and a liquid.

A conventional method known in the art for use in the polymerization of 1-olefin having 2 to 10 carbon atoms can be used as a method for polymerizing (homopolymerizing or copolymerizing) an olefin. Examples thereof include slurry polymerization which involves performing polymerization by supplying a gas or liquid monomer in the presence of an organic solvent, bulk polymerization which involves performing polymerization in the presence of a liquid monomer such as liquefied propylene, and vapor-phase polymerization which involves performing polymerization in the presence of a gas monomer. Any of these methods can perform polymerization reaction. The polymerization is preferably vapor-phase polymerization.

For example, a method described in Japanese Patent No. 2578408, a continuous vapor-phase polymerization method described in Japanese Patent No. 4392064 or Japanese Patent Laid-Open No. 2009-292964, or a polymerization method described in Japanese Patent No. 2766523 is also applicable thereto. Each polymerization method described above can be performed in any of a batch manner and a continuous manner. Furthermore, the polymerization reaction may be performed at one stage or may be performed at two or more stages.

In the case of polymerizing (homopolymerizing or copolymerizing) an olefin using the catalyst for polymerization of olefins according to the present invention, examples of the polymerization reactor can include reactors such as autoclaves with stirrers, and fluidized bed reactors. A polymer in a granular or powdery form can be housed in a solid phase in this reactor and given movement using a stirring apparatus or a fluidized bed.

The molecular weight of the polymer to be obtained can be adjusted and set in a wide range by adding an adjuster routinely used in polymerization technology, for example, hydrogen. For the copolymerization of, for example, propylene with an additional comonomer in copolymerization reaction, the incorporation of the comonomer into a polymer chain can be adjusted by appropriately adding alkanol having 1 to 8 carbon atoms, particularly, isopropanol.

In order to remove the heat of polymerization, liquid easily volatile hydrocarbon, for example, propane or butane, may be supplied and vaporized in a polymerization zone.

The polymerization temperature is preferably 200° C. or lower, more preferably 100° C. or lower, further preferably 50 to 90° C.

The polymerization pressure is preferably normal pressure to 10 MPa, more preferably normal pressure to 5 MPa, further preferably 1 to 4 MPa.

For the copolymerization of, for example, propylene with an additional comonomer in copolymerization reaction, it is preferred to adjust the partial pressures of the propylene and the comonomer so as to be 1:99 to 99:1, and it is more preferred to adjust the partial pressures of the propylene and the comonomer so as to be 50:50 to 99:1.

In the case of copolymerizing propylene with an olefin other than propylene using the catalyst for polymerization of olefins according to the present invention, it is preferred to produce a propylene copolymer by polymerizing propylene using the catalyst for polymerization of olefins according to the present invention, and subsequently copolymerizing two or more olefins.

The combination of the two or more olefins is preferably a combination of propylene and an olefin other than propylene. Examples of the olefin other than propylene can include one or more olefins selected from ethylene, 1-butene, 1-pentene, 4-methyl-1-pentene and vinylcyclohexane. Ethylene or 1-butene is preferred.

In the case of homopolymerizing or copolymerizing an olefin (performing main polymerization) using the catalyst for polymerization of olefins according to the present invention, it is desirable to perform prepolymerization prior to the main polymerization, for further improving catalytic activity, stereoregularity and the particle properties of the polymer to be produced, etc. For the prepolymerization, the same olefin or monomer such as styrene as in the main polymerization can be used.

The order of contact of each component constituting the catalyst for polymerization of olefins according to the present invention, and monomers is arbitrary for performing the prepolymerization. Preferably, the organoaluminum compound represented by the general formula (I) is first charged into a prepolymerization system set to an inert gas atmosphere or an olefin gas atmosphere. Subsequently, the solid catalyst component for polymerization of olefins is brought into contact. Then, an olefin such as propylene and/or one or two or more additional olefins are brought into contact. In the case of performing prepolymerization in combination with the external electron-donating compound, a method is desirable which involves first charging the organoaluminum compound represented by the general formula (I) into a prepolymerization system set to an inert gas atmosphere or an olefin gas atmosphere, subsequently bringing the external electron-donating compound into contact, further bringing the solid catalyst component for polymerization of olefins into contact, and then bringing an olefin such as propylene and/or one or two or more additional olefins into contact.

The method for producing a propylene copolymer according to the present invention can homopolymerize or copolymerize an olefin using the catalyst for polymerization of olefins according to the present invention, thereby producing a polymer that has very low adherence ascribable to the stickiness (tackiness) of polymer particles, is excellent in flowability, and also has a favorable particle size distribution, particularly, in order to perform the copolymerization, such as random copolymerization or block copolymerization, of propylene and ethylene.

The propylene copolymer according to the present invention has a pore volume of 0.10 to 0.23 cm$^3$/g measured by a mercury intrusion method.

In the present application, the polymer (e.g., a propylene polymer) and the propylene copolymer mean polymer particles obtained through the polymerization reaction of an olefin, i.e., reactor powders before processing such as pelletization.

The propylene copolymer according to the present invention is preferably a polymerization product of olefins including propylene in the presence of the catalyst for polymerization of olefins according to the present invention.

The propylene copolymer according to the present invention is preferably obtained by multistage polymerization having two or more stages, more preferably obtained by polymerizing propylene by polymerization at the first stage, and subsequently copolymerizing the propylene with one or more olefins selected from olefins other than propylene by polymerization at a subsequent stage (the second or later stage), further preferably obtained by homopolymerizing propylene by polymerization at the first stage (homo stage), and subsequently copolymerizing the propylene with one or more olefins selected from olefins other than propylene by polymerization at a subsequent stage (the second or later stage), and still further preferably obtained by homopolymerizing propylene by polymerization at the first stage (homo stage), and subsequently copolymerizing the propylene with one or more olefins selected from ethylene and 1-butene.

For the propylene copolymer according to the present invention, the pore volume measured by the mercury intrusion method, of an olefin polymer obtained after polymerization at the first stage (e.g., propylene homopolymerization) in the multistage polymerization having two or more stages is preferably in the range from 0.12 to 0.36 cm$^3$/g, more preferably in the range from 0.13 to 0.35 cm$^3$/g, further preferably in the range from 0.18 to 0.26 cm$^3$/g.

Particularly, when the polymerization product obtained after the polymerization at the first stage is a propylene polymerization product in the presence of the catalyst for polymerization of olefins according to the present invention, the pore volume of the resulting propylene polymer can be easily controlled to within the range described above. In the system containing such a propylene polymer, the propylene can be subsequently copolymerized with an olefin other than propylene to easily obtain the copolymer of interest.

When the pore volume of the propylene homopolymer produced in the preceding step falls within the range described above, an ethylene-propylene copolymer produced in a subsequent step is easily incorporated into the pores of the propylene homopolymer. Thus, a copolymer excellent in flowability can be obtained while stickiness is suppressed.

The pore volume of the propylene homopolymer means a value measured by the mercury intrusion method.

For the propylene copolymer according to the present invention, the pore volume measured by the mercury intrusion method, of the propylene copolymer obtained after polymerization at the second or later stage (e.g., the copolymerization of propylene with an additional olefin other than propylene) in the multistage polymerization having two or more stages is in the range from 0.10 to 0.23 cm$^3$/g, preferably in the range from 0.12 to 0.20 cm$^3$/g, more preferably in the range from 0.13 to 0.20 cm$^3$/g.

When the pore volume distributions of the olefin polymer obtained after polymerization at the first stage (homo stage) and the olefin polymer obtained after polymerization at the second or later stage fall within the respective ranges described above, a component responsible for the stickiness of the particle surface of the resulting propylene copolymer easily remains inside the pores of the polymer particles. Thus, the flow properties of the copolymer particles are improved.

The propylene copolymer according to the present invention preferably has pores having a pore radius of 0.1 to 40 μm, more preferably 1 to 20 μm, further preferably 2 to 10 μm, measured by the mercury intrusion method.

When the propylene copolymer according to the present invention has a large number of pores having the pore radius, the polymer produced in the polymerization step at the second or later stage is easily incorporated into the pores of the polymer (e.g., a propylene homopolymer) obtained by polymerization at the first stage. Thus, the stickiness of the surface of the resulting copolymer is suppressed, and excellent flowability can be easily exerted.

The propylene copolymer according to the present invention is obtained by multistage polymerization having two or more stages. In this case, the volume ratio of the pore volume of an olefin polymer obtained after polymerization at the second or later stage (at any stage) to the pore volume of a polymer obtained after polymerization at the first stage {(Pore volume of an olefin polymer obtained after polymerization at the second or later stage (at any stage)/Pore volume of a polymer obtained after polymerization at the first stage)×100} is preferably in the range from 30 to 99%, more preferably in the range from 35 to 95%, further preferably in the range from 40 to 90%, still further preferably in the range from 50 to 90%.

In the propylene copolymer according to the present invention, when the volume ratio of the pore volume of the propylene copolymer obtained after polymerization at the second or later stage (e.g., the copolymerization of propylene with an additional olefin other than propylene) to the pore volume of the polymer obtained after polymerization at the first stage (e.g., the homopolymerization of propylene) falls within the range described above, the polymer produced in the polymerization step at the second or later stage is easily incorporated into the pores of the polymer (e.g., a propylene homopolymer) obtained by polymerization at the first stage, even under polymerization conditions that offer a larger content of the polymer (e.g., a copolymer component) produced by the polymerization at the second or later stage. Thus, a copolymer excellent in flowability can be obtained because the stickiness of the surface of the resulting copolymer is suppressed.

Particles of the propylene copolymer according to the present invention preferably have at least one peak top in a pore radius range from 0.1 μm to 40 μm, more preferably at least one peak top in a pore radius range from 1 μm to 20 μm, further preferably at least one peak top in a pore radius range from 1 μm to 10 μm, still further preferably at least one peak top in a pore radius range from 1.5 μm to 5 μm, in a pore volume distribution measured by the mercury intrusion method.

When at least one peak top is present in the range described above in the pore volume distribution measured by the mercury intrusion method, the propylene copolymer (responsible for stickiness) easily remains inside the pores of the polymer particles, reducing the stickiness of the particle surface. This facilitates improving the flow properties of the copolymer.

In the propylene copolymer according to the present invention, for at least one peak having the peak top, the ratio of the half width (μm) of the peak in the pore volume distribution to the pore radius (μm) of the peak top in the pore volume distribution (half width (μm) of the peak in the pore volume distribution/pore radius (μm) of the peak top in the pore volume distribution) is preferably 2.0 or less, more preferably 1.9 or less, further preferably 0.5 to 1.8.

When the ratio represented by half width (μm) of the peak in the pore volume distribution/pore radius (μm) of the peak top in the pore volume distribution is 2.0 or less, the propylene copolymer easily remains inside pores with a moderate pore size and volume dispersed in the whole polymer particles. This facilitates reducing the stickiness of the particle surface and improving the flow properties of the copolymer particles.

In the present application, the pore radius of the peak top in the pore volume distribution means a pore radius (μm) that exhibits a peak top in a pore volume distribution with respect to each pore radius when the pore volume of the obtained copolymer is automatically measured by the mercury intrusion method. The half width of the peak in the pore volume distribution means the absolute value of delta between two pore radiuses in half the height of the peak that exhibits the peak top in the pore volume distribution.

For the propylene copolymer according to the present invention, the sum of pore volumes in a pore radius range from 1 to 20 μm measured by the mercury intrusion method is preferably 0.09 to 0.21 cm$^3$/g, more preferably 0.09 to 0.18 cm$^3$/g, further preferably 0.10 to 0.17 cm$^3$/g.

When the sum of pore volumes in a pore radius range from 1 to 20 μm measured by the mercury intrusion method falls within the range described above, the copolymer produced in the polymerization step at the second or later stage is easily incorporated into pores in the copolymer particles, even under polymerization conditions that offer a larger content of the copolymer of olefins obtained after polymerization at the second or later stage. Thus, the stickiness of the surface of the resulting copolymer is suppressed, and excellent flowability can be easily exerted.

In the propylene copolymer according to the present invention, polymer flowability represented by the amount of the polymer falling per second (g/sec) is preferably 12.0 or more, more preferably 12.5 or more, further preferably 13.0 or more.

In the present application, the polymer flowability of the propylene copolymer is represented by the amount of the polymer falling per second (g/sec) and refers to the amount of the polymer falling per second (g/sec) determined by using an apparatus, as shown in FIG. 1, equipped at its upper portion with funnel 1 (upper aperture: 91 mm, damper-position aperture: 8 mm, inclination angle: 20°, height up to the damper position: 114 mm) with damper 2 disposed at an outlet position, and provided with container-like receiver 3 (inside diameter: 40 mm, height: 81 mm) with a space of 38 mm beneath the damper 2, adding 50 g of the propylene copolymer to the funnel 1, then opening the damper 2 at room temperature (20° C.) so that the polymer inside the funnel falls to the receiver 3, and measuring time $T^1$ (sec) for the whole polymer to fall, followed by calculation from the falling time $T^1$ (sec) of 50 g of the propylene copolymer according to the following expression:

Polymer flowability (amount of the polymer falling per second (g/sec))=$50/T^1$

When the flowability of the copolymer falls within the range described above, the polymer is less likely to adhere to a reactor, piping, and the like during polymerization and during transport after the polymerization. Thus, a propylene copolymer excellent in powder flowability can be easily produced.

The particle size distribution index (SPAN) of the propylene copolymer according to the present invention is preferably 1 or less, more preferably 0.96 or less, further preferably 0.93 or less.

In the present application, the particle size distribution index (SPAN) of the propylene copolymer means a value calculated according to the following expression on the basis of 10% particle size ($D_{10}$), 50% particle size ($D_{50}$) and 90% particle size ($D_{90}$) in the volume-based integrated particle size of the copolymer obtained using a digital image analysis-type particle size distribution measurement apparatus (CAMSIZER, manufactured by Horiba, Ltd.).

Particle size distribution index (SPAN)=(90% particle size ($D_{90}$) in the volume-based integrated particle size–10% particle size ($D_{10}$) in the volume-based integrated particle size)/50% particle size ($D_{50}$) in the volume-based integrated particle size When the propylene copolymer according to the present invention is prepared by first homopolymerizing only propylene at one stage or a plurality of stages, the resulting propylene polymer (homo PP) desirably has high stereoregularity. The xylene soluble (XS) of the homo PP is preferably 1.5% by mass or lower, more preferably 1.0% by mass or lower.

When the stereoregularity of the propylene polymer (homo PP) obtained at the stage of homopolymerization of propylene (homo stage) falls within the range described above, a propylene copolymer having high rigidity and excellent impact resistance is obtained.

In the present application, the xylene soluble (XS) means the mass ratio (% by mass) of a residue to a polymer (polypropylene) used to be measured in the measurement of the mass of the residue obtained by charging 4.0 g of the obtained polymer and 200 ml of p-xylene into a flask equipped with a stirring apparatus, setting an outside temperature to a temperature equal to or higher than (approximately 150° C.) the boiling point of xylene and thereby keeping the temperature of the p-xylene inside the flask at the boiling point (137 to 138° C.), dissolving the polymer over 2 hours, then cooling the resultant to 23° C., separating an undissolved component and a dissolved component by filtration, and heating and drying the thus-obtained dissolved component under reduced pressure to distill off p-xylene.

The present invention can provide a propylene copolymer that has very low adherence ascribable to stickiness (tackiness), is excellent in flowability, and also has a favorable particle size distribution.

EXAMPLES

Next, the present invention will be described more specifically with reference to Examples. However, the present invention is not limited by Examples below by any means.

Production Example 1

<Preparation of Diethoxy Magnesium>

Into a cylindrical flask (capacity: 10 L) equipped with a stirrer and a reflux condenser and thoroughly purged with nitrogen gas, 1000 ml of anhydrous ethanol and 30 g of iodine were charged, and boiled and refluxed by heating. A slurry of 500 g in total of metal magnesium and 7600 ml of anhydrous ethanol was continuously added into this flask over 1 hour and reacted under reflux.

Then, aging reaction was performed for 3 hours under reflux until the generation of hydrogen was terminated. The obtained solid matter was washed with anhydrous ethanol and dried under reduced pressure to obtain a spherical diethoxy magnesium powder.

An ethanol content, a bulk specific gravity, an average particle size, the presence or absence of peak tops in a radius range from 0.002 μm to 1 μm and a radius range from larger than 1 μm to 30 μm or smaller, the pore volume of pores having a peak in each radius range described above, and a total pore volume were measured as to the obtained diethoxy magnesium.

As a result, the ethanol content was 0% by mass. The bulk specific gravity was 0.27 g/ml. The average particle size was 27.8 μm. The number of peak tops in the radius range from 0.002 μm to 1 μm measured by the mercury intrusion method was 1. The position of this peak top was 0.15 μm. Pore volume v1 in this range was 0.78 cm³/g. The number of peak tops in the radius range from larger than 1 μm to 30 μm or smaller was 1. The position of this peak top was 3.8 μm. Pore volume v2 in this range was 1.21 cm³/g. The total pore volume of pores having a radius of 0.002 μm to 30 μm was 1.99 cm³/g.

The volume ratio represented by pore volume v1/pore volume v2 was 0.64.

The results are shown in Table 1.

The ethanol content, the bulk density, the average particle size, the pore volume and the porosity (mercury intrusion method) were measured by the following methods.

(Ethanol Content)

The ethanol content of diethoxy magnesium was determined from a decrement in mass when 20 g of a sample was charged into an eggplant-shaped flask and dried under reduced pressure at room temperature for 1 hour and further at 50° C. for 2 hours with a degree of reduced pressure of 0.02 to 0.05 mmHg.
(Bulk Specific Gravity)

The bulk density (BD) of diethoxy magnesium or a solid catalyst component was measured in accordance with JIS K-6721: 1997 in a dry nitrogen gas atmosphere.
(Average Particle Size)

As for the average particle size of alkoxy magnesium, a particle size corresponding to 50% of a volume-integrated particle size was measured using ethanol as a dispersing solvent and a laser diffraction particle size distribution measurement apparatus (MICROTRAC HRA Model No. 9320-X100, manufactured by Nikkiso Co., Ltd.).

As for the average particle size of a solid catalyst component, a particle size corresponding to 50% of a volume-integrated particle size was measured using n-heptane as a dispersing solvent and a laser diffraction particle size distribution measurement apparatus (MICROTRAC MT3300EXII, manufactured by Nikkiso Co., Ltd.).
(The Number of Peak Tops, Position of Peak Top and Pore Volume)

The pore volume of alkoxy magnesium or a solid catalyst component was determined by using a mercury intrusion method porosimeter (manufactured by Micromeritics Instrument Corp., AutoPore III 9420), and charging 0.1 to 0.2 g of a sample into a sample for 5 ml powders, followed by automatic measurement.

In this operation, the measurement range was set to a pore radius from 0.002 to 30 μm.

Production Example 2

<Preparation of Diethoxy Magnesium>

A spherical diethoxy magnesium powder was prepared in the same way as in Production Example 1 except that 100 g of iodine was used instead of 30 g of iodine.

As a result of measuring the physical properties of the obtained diethoxy magnesium by the same methods as in Production Example 1, the ethanol content was 0% by mass. The bulk specific gravity was 0.29 g/ml. The average particle size was 26.6 μm. The number of peak tops in the radius range from 0.002 μm to 1 μm measured by the mercury intrusion method was 1. The position of this peak top was 0.10 μm. Pore volume v1 in this range was 0.69 cm$^3$/g. The number of peak tops in the radius range from larger than 1 μm to 30 μm or smaller was 1. The position of this peak top was 3.8 μm. Pore volume v2 in this range was 1.09 cm$^3$/g. The total pore volume of pores having a radius of 0.002 μm to 30 μm was 1.78 cm$^3$/g.

The volume ratio represented by pore volume v1/pore volume v2 was 0.63. The results are shown in Table 1.

TABLE 1

| | Bulk specific gravity g/ml | Average particle size μm | v1 cm$^3$/g | v2 cm$^3$/g | v1/v2 | Total pore volume cm$^3$/g |
|---|---|---|---|---|---|---|
| Production Example 1 | 0.27 | 27.8 | 0.78 | 1.21 | 0.64 | 1.99 |
| Production Example 2 | 0.29 | 26.6 | 0.69 | 1.09 | 0.63 | 1.78 |

Example 1

<Preparation of Solid Catalyst Component>

Into a round-bottom flask (capacity: 200 ml) equipped with a stirrer and thoroughly purged with nitrogen gas, 10 g of the spherical diethoxy magnesium powder obtained in Production Example 1, 50 ml of toluene and 3.6 ml of di-n-butyl phthalate were charged to create a suspended state. Subsequently, the suspension was added over 4 hours into a mixed solution of 26 ml of toluene and 24 ml of titanium tetrachloride charged in advance into a round-bottom flask (capacity: 500 ml) equipped with a stirrer and thoroughly purged with nitrogen gas. In this operation, the temperature of the reaction system was kept in the range from −7 to −2° C. After the completion of addition, the mixture was warmed to 90° C. and subjected to contact reaction over 1 hour with stirring. After the completion of reaction, the reaction product was washed twice with 100 ml of toluene of 100° C. Further, 24 ml of titanium tetrachloride and 76 ml of toluene were added thereto, and the mixture was subjected to contact reaction at 110° C. for 2 hours with stirring. The produced solid component was washed 10 times with 200 ml of n-heptane of 40° C. and then dried until the residual rate of heptane was 20% by mass or lower, to obtain a solid catalyst component in a powdery form.

A BET specific surface area (BET method: N$_2$SA), an average particle size, the presence or absence of peak tops in a radius range from 0.002 μm to 1 μm and peak tops in a radius range from larger than 1 μm to 30 μm or smaller, the pore volume of pores having a peak in each radius range described above, and a total pore volume were measured as to the obtained solid catalyst component by the same method as in Production Example 1. Also, a BET specific surface area (BET method: N$_2$SA) was measured by a method given below.

As a result, the specific surface area (N$_2$SA) by the BET method was 113 m$^2$/g. The average particle size was 31.2 μm. The number of peak tops in the radius range from 0.002 μm to 1 μm measured by the mercury intrusion method was 2. The positions of these peak tops were 0.007 μm and 0.15 μm. Pore volume V1 in this range was 0.28 cm$^3$/g. The number of peak tops in the radius range from larger than 1 μm to 30 μm or smaller was 1. The position of this peak top was 5.1 μm. Pore volume V2 in this range was 0.75 cm$^3$/g. The total pore volume of pores having a radius of 0.002 μm to 30 μm was 1.03 cm$^3$/g. The volume ratio represented by pore volume V1/pore volume V2 was 0.37.

The results are shown in Table 2.

The BET specific surface area was measured by the following method.
(BET Specific Surface Area)

The BET specific surface area of the solid catalyst component was determined by using a specific surface area measurement machine (manufactured by Quantachrome Corp., QUANTASORB QS-17), and automatically measuring 0.05 to 0.1 g of a sample charged in a sample cell.
<Preparation of Catalyst for Polymerization of Olefins>

Into an autoclave (internal volume: 2.0 L) with a stirrer thoroughly purged with nitrogen gas, 0.92 mmol of triethyl aluminum, 0.092 mmol of cyclohexylmethyldimethoxysilane and 0.0018 mmol (in terms of a titanium atom) of the solid catalyst component obtained as described above were charged to prepare a catalyst for polymerization of olefins.
(Propylene Polymerization (PP Polymerization))

Into the autoclave with a stirrer containing the catalyst for polymerization of olefins prepared as described above, 1.6 l of hydrogen gas and 1.0 l of liquefied propylene were charged. Prepolymerization was performed at 20° C. for 5 minutes, followed by warming. Polymerization reaction was performed at 70° C. for 1 hour to produce a propylene polymer (PP).

Polymerization activity (PP polymerization activity) per g of the solid catalyst component, the xylene soluble (XS) of the obtained polymer, and the pore volume, average particle size, amount of a fine powder, amount of a coarse powder, particle size distribution index (SPAN) and bulk density of the obtained polymer were measured in the obtained polymer by methods given below. The results are shown in Table 3.

(PP Polymerization Activity Per g of Solid Catalyst Component)

The PP polymerization activity per g of the solid catalyst component (g-pp/g-catalyst) was determined according to the following expression.

PP polymerization activity (g-pp/g-catalyst)=Mass (g) of the obtained propylene polymer (PP)/Mass (g) of the solid catalyst component contained in the catalyst for polymerization of olefins (Xylene Soluble (XS) of Polymer)

Into a flask equipped with a stirring apparatus, 4.0 g of the obtained polymer and 200 ml of p-xylene were charged. The outside temperature was set to a temperature equal to or higher than (approximately 150° C.) the boiling point of xylene so that the polymer was dissolved over 2 hours while the temperature of the p-xylene inside the flask was kept at the boiling point (137 to 138° C.)

Then, the resultant was cooled to 23° C., and an undissolved component and a dissolved component were separated by filtration. The solution of the dissolved component was collected, and heated and dried under reduced pressure to distill off p-xylene. The obtained residue was regarded as the xylene soluble (XS). From the mass thereof, a relative value (% by mass) to the polymer (polypropylene) was determined.

<Pore Volume of Polymer>

The pore volume of the polymer (PP) at the homo stage was determined by using a mercury porosimeter (manufactured by Micromeritics Instrument Corp., AutoPore IV9505), and charging 0.4 to 0.6 g of a sample into a sample for 5 ml powders, followed by automatic measurement by the mercury intrusion method. In this operation, the measurement range was set to a pore radius from 0.1 to 40 µm.

(Particle Size Distribution, Amount of Fine Powder, Amount of Coarse Powder, Average Particle Size and Particle Size Distribution Index (SPAN) of Polymer)

The volume-based integrated particle size distribution of the obtained polymer was automatically measured under the following measurement conditions using a digital image analysis-type particle size distribution measurement apparatus (CAMSIZER, manufactured by Horiba, Ltd.) to measure the amount (% by mass (wt)) of a fine powder having a particle size of smaller than 75 µm, the amount (% by mass (wt)) of a coarse powder having a particle size of larger than 1700 µm, 50% particle size in the volume-based integrated particle size (average particle size $D_{50}$) and the particle size distribution index (SPAN).

(Measurement Conditions)
  Funnel position: 6 mm
  Cover area of camera: less than 3% for a basic camera, less than 10% for a zoom camera
  Target cover area: 0.5%
  Feeder width: 40 mm
  Feeder control level: 57 and 40 sec
  Measurement start level: 47
  Maximum control level: 80
  Control reference: 20
  Image rate: 50% (1:2)
  Definition of particle size: the smallest value of Martin's diameters measured n times per particle
  SPHT (sphericity) fitting: 1
  Upper limit value of class: 50 points were selected in the range from 32 µm to 4000 µm in a logarithmic scale The particle size distribution index (SPAN) was calculated according to the following expression.

Particle size distribution index (SPAN)=(90% particle size in the volume-based integrated particle size−10% particle size in the volume-based integrated particle size)/50% particle size in the volume-based integrated particle size (average particle size $D_{50}$)

(Bulk Density (BD))

The bulk density (BD) of the obtained polymer was measured in accordance with JIS K-6721: 1997.

<Preparation of Ethylene-Propylene Copolymerization Catalyst>

Into an autoclave (internal volume: 2.0 L) with a stirrer thoroughly purged with nitrogen gas, 2.4 mmol of triethyl aluminum, 0.24 mmol of cyclohexylmethyldimethoxysilane and 6 mg of the solid catalyst component obtained as described above were charged to prepare an ethylene-propylene copolymerization catalyst.

<Ethylene-Propylene Copolymerization>

Into the autoclave with a stirrer containing the ethylene-propylene copolymerization catalyst prepared as described above, 15 mol (1.2 l) of liquefied propylene and 0.20 MPa (partial pressure) of hydrogen gas were charged. Prepolymerization was performed at 20° C. for 5 minutes, followed by warming. Propylene homopolymerization reaction at the first stage (polymerization at a homo stage) was performed at 70° C. for 45 minutes. Then, the pressure was brought back to normal pressure. Subsequently, the autoclave (reactor) was purged with nitrogen, and then, the autoclave was weighed. Polymerization activity at the homo stage (first stage) (homo activity, g-PP/g-cat) was calculated by subtracting the tare mass of the autoclave.

A portion of the produced polymer was separated for evaluation of polymerization performance and polymer physical properties (pore volume).

Next, ethylene/propylene was added at a molar ratio of 1.0/1.0 into the autoclave (reactor) and then warmed to 70° C. While ethylene/propylene/hydrogen was introduced thereto such that the respective gas supplies per minute (1/min) were at a ratio of 2/2/0.086, reaction was performed under conditions of 1.2 MPa, 70° C. and 60 minutes to obtain an ethylene-propylene copolymer.

Impact copolymer (ICP) activity (g-ICP/g-cat·hr), an EPR content (% by mass), a pore volume, the flowability of the ethylene-propylene block copolymer, the pore volume of the polymer, the pore radius of a peak top in a pore volume distribution and the half width of a peak in the pore volume distribution were measured in the obtained ethylene-propylene copolymer by methods given below.

The results are shown in Tables 4 and 5 (for comparison, results of determining the pore radius of a peak top in a pore volume distribution and the half width of a peak in the pore volume distribution as to the polymer (PP) at the homo stage by the same methods as above are also shown in Table 5).

The obtained ethylene-propylene copolymer had one peak top in a pore radius range from 0.1 µm to 40 µm.

<Impact Copolymer (ICP) Activity (g-ICP/g-cat·hr)>

The impact copolymer (ICP) activity at the time of ethylene-propylene block copolymer formation was calculated according to the following expression.

Impact copolymer (ICP) activity (g-ICP/g-cat·hr)=(($I$ (g)−$G$ (g))/Mass (g) of the solid catalyst component contained in the catalyst for polymerization of olefins)/Reaction time (hr)

In this context, I (g) is the mass (g) of the autoclave after the completion of copolymerization reaction, and G (g) is the mass (g) of the autoclave after removal of unreacted monomers after completion of homo PP polymerization reaction.

<EPR Content>

To a 1 L flask equipped with a stirrer and a condenser, approximately 2.5 g of the copolymer, 8 mg of 2,6-di-t-butyl-p-cresol and 250 ml of p-xylene were added, and the mixture was stirred until the copolymer was completely dissolved at the boiling point. Next, the flask was cooled to room temperature and left for 15 hours to deposit solid matter. This solid matter was separated from a liquid-phase portion using a centrifuge. Then, the separated solid matter was placed in a beaker. 500 ml of acetone was injected to the beaker, and the mixture was stirred at room temperature for 15 hours. Then, the solid matter was filtered and dried, and its dry mass was measured (this mass was defined as B (g)). Also, the same operation as above was performed as to the separated liquid-phase portion. Solid matter was deposited and then dried, and its dry mass was measured (this mass was defined as C (g)). The ethylene-propylene rubber component (EPR) content in the copolymer was calculated according to the following expression.

EPR content (% by mass)=[$C$ (g)/{$B$ (g)+$C$ (g)}]×100

<Flowability of Ethylene-Propylene Block Copolymer>

The apparatus used was, as shown in FIG. 1, equipped at its upper portion with funnel 1 (upper aperture: 91 mm, damper-position aperture: 8 mm, inclination angle: 20°, height up to the damper position: 114 mm) with damper 2 disposed at an outlet position, and provided with container-like receiver 3 (inside diameter: 40 mm, height: 81 mm) with a space of 38 mm beneath the damper 2. First, 50 g of the polymer was added to the funnel 1 located in an upper portion. Then, the damper 2 was opened at room temperature (20° C.) so that the polymer fell to the receiver 3. The time for the whole polymer to fall was measured.

From falling time $T^1$ (sec) of 50 g of the ethylene-propylene block copolymer measured by the operation described above, the amount of the polymer falling per second (g/sec) was calculated according to the following expression and used as an index for the evaluation of polymer flowability.

Polymer flowability (amount of the polymer falling per second (g/sec))=50/$T^1$

<Pore Volume of Polymer>

The pore volume of the polymer (PP) at the homo stage or the copolymer (ICP) was determined by using a mercury porosimeter (manufactured by Micromeritics Instrument Corp., AutoPore IV9505), and charging 0.4 to 0.6 g of a sample into a sample for 5 ml powders, followed by automatic measurement by the mercury intrusion method. In this operation, the measurement range was set to a pore radius from 0.1 to 40 μm.

<Pore Radius of Peak Top in Pore Volume Distribution and Half Width of Peak in Pore Volume Distribution>

The pore volumes of the obtained polymer (PP) at the homo stage and copolymer (ICP) in a pore radius range from 0.1 μm to 40 μm were each automatically measured by the mercury intrusion method. A pore radius (μm) that exhibited peak top in the pore volume distribution with respect to each pore radius was defined as the pore radius of the peak top in the pore volume distribution.

Also, the half width of the peak in the pore volume distribution was set to the absolute value of delta between two pore radiuses in half the height of the peak that exhibited the peak top in the pore volume distribution of the copolymer.

Example 2

A solid catalyst component was prepared in the same way as in Example 1 except that when the suspension of diethoxy magnesium, toluene and di-n-butyl phthalate was added to the mixed solution of toluene and titanium tetrachloride, the temperature of the reaction system to be kept was changed from the range from −7 to −2° C. to the range from 3 to 8° C.

As a result of measuring various physical properties of the obtained solid catalyst component by the same method as in Example 1, the specific surface area ($N_2SA$) by the BET method was 66 m$^2$/g. The average particle size was 28.2 μm. The number of peak tops in the radius range from 0.002 μm to 1 μm measured by the mercury intrusion method was 2. The positions of these peak tops were 0.008 μm and 0.24 μm. Pore volume V1 in this range was 0.30 cm$^3$/g. The number of peak tops in the radius range from larger than 1 μm to 30 μm or smaller was 1. The position of this peak top was 5.1 μm. Pore volume V2 in this range was 0.75 cm$^3$/g. The total pore volume of pores having a radius of 0.002 μm to 30 μm was 1.05 cm$^3$/g. The volume ratio represented by pore volume V1/pore volume V2 was 0.40. The results are shown in Table 2.

The preparation of a catalyst for polymerization of olefins and a catalyst for ethylene-propylene block copolymerization, propylene polymerization and ethylene-propylene block copolymerization were performed in the same way as in Example 1 except that the solid catalyst component described above was used. Various physical properties were measured. The results are shown in Tables 3, 4 and 5.

The obtained ethylene-propylene copolymer had one peak top in a pore radius range from 0.1 μm to 40 μm.

Comparative Example 1

A solid catalyst component was prepared in the same way as in Example 1 except that when the suspension of diethoxy magnesium, toluene and di-n-butyl phthalate was added to the mixed solution of toluene and titanium tetrachloride, the temperature of the reaction system to be kept was changed from the range from −7 to −2° C. to the range from 20 to 25° C.

As a result of measuring various physical properties of the obtained solid catalyst component by the same method as in Example 1, the specific surface area ($N_2SA$) by the BET method was 18 m$^2$/g. The average particle size was 23.4 μm. The number of peak tops in the radius range from 0.002 μm to 1 μm measured by the mercury intrusion method was 2. The positions of these peak tops were 0.007 μm and 0.15 μm. Pore volume V1 in this range was 0.44 cm$^3$/g. The number of peak tops in the radius range from larger than 1 μm to 30 μm or smaller was 1. The position of this peak top was 3.8 μm. Pore volume V2 in this range was 0.64 cm$^3$/g. The total pore volume of pores having a radius of 0.002 µm to 30 µm was 1.08 cm³/g. The volume ratio represented by pore volume V1/pore volume V2 was 0.69. The results are shown in Table 2.

The preparation of a catalyst for polymerization of olefins and a catalyst for ethylene-propylene block copolymerization, propylene polymerization and ethylene-propylene block copolymerization were performed in the same way as in Example 1 except that the solid catalyst component described above was used. Various physical properties were measured. The results are shown in Tables 3, 4 and 5.

The obtained ethylene-propylene copolymer had one peak top in a pore radius range from 0.1 µm to 40 µm.

Example 3

<Preparation of Solid Catalyst Component>

Into a round-bottom flask (capacity: 200 ml) equipped with a stirrer and thoroughly purged with nitrogen gas, 10 g of the spherical diethoxy magnesium powder prepared in Production Example 2, 50 ml of toluene and 3.6 ml of di-n-butyl phthalate were charged to create a suspended state.

Subsequently, the suspension was added over 4 hours into a mixed solution of 26 ml of toluene and 24 ml of titanium tetrachloride charged in advance into a round-bottom flask (capacity: 500 ml) equipped with a stirrer and thoroughly purged with nitrogen gas. In this operation, the temperature of the reaction system was kept in the range from −7 to −2° C. The mixture was stirred for 1 hour at −5° C. Then, the mixture was warmed to 100° C. over 4 hours and reacted for 2 hours with stirring.

After the completion of reaction, the product was washed four times with 100 ml of toluene of 100° C. Further, 24 ml of titanium tetrachloride and 76 ml of toluene were added thereto, and the mixture was kept at a temperature of 80° C. and subjected to contact reaction for 2 hours with stirring. Subsequently, the product was washed 7 times with heptane of 40° C., filtered, and dried to obtain a solid catalyst component in a powdery form.

As a result of measuring various physical properties of the obtained solid catalyst component by the same method as in Example 1, the average particle size was 23.3 µm. The number of peak tops in the radius range from 0.002 µm to 1 µm measured by the mercury intrusion method was 2. The positions of these peak tops were 0.006 µm and 0.10 µm. Pore volume V1 in this range was 0.21 cm³/g. The number of peak tops in the radius range from larger than 1 µm to 30 µm or smaller was 1. The position of this peak top was 4.2 µm. Pore volume V2 in this range was 0.61 cm³/g. The total pore volume of pores having a radius of 0.002 µm to 30 µm was 0.82 cm³/g. The volume ratio represented by pore volume V1/pore volume V2 was 0.34. The results are shown in Table 2.

The preparation of a catalyst for polymerization of olefins and a catalyst for ethylene-propylene block copolymerization, propylene polymerization and ethylene-propylene block copolymerization were performed in the same way as in Example 1 except that the solid catalyst component described above was used. Various physical properties were measured. The results are shown in Tables 3, 4 and 5.

The obtained ethylene-propylene copolymer had one peak top in a pore radius range from 0.1 µm to 40 µm.

Comparative Example 2

A solid catalyst component was prepared in the same way as in Example 3 except that when the suspension of diethoxy magnesium, toluene and di-n-butyl phthalate was added to the mixed solution of toluene and titanium tetrachloride, the addition time of the suspension was changed from 4 hours to 1 hour.

As a result of measuring various physical properties of the obtained solid catalyst component by the same method as in Example 1, the specific surface area (N₂SA) by the BET method was 2.0 m²/g. The average particle size was 23.3 µm. The number of peak tops in the radius range from 0.002 µm to 1 µm measured by the mercury intrusion method was 2. The positions of these peak tops were 0.006 µm and 0.10 µm. Pore volume V1 in this range was 0.19 cm³/g. The number of peak tops in the radius range from larger than 1 µm to 30 µm or smaller was 1. The position of this peak top was 5.1 µm. Pore volume V2 in this range was 0.65 cm³/g. The total pore volume of pores having a radius of 0.002 µm to 30 µm was 0.84 cm³/g. The volume ratio represented by pore volume V1/pore volume V2 was 0.29. The results are shown in Table 2.

The preparation of a catalyst for polymerization of olefins and a catalyst for ethylene-propylene block copolymerization, propylene polymerization and ethylene-propylene block copolymerization were performed in the same way as in Example 1 except that the solid catalyst component described above was used. Various physical properties were measured. The results are shown in Tables 3, 4 and 5.

Example 4

A solid catalyst component was prepared in the same way as in Example 3 except that when the diethoxy magnesium powder, toluene and di-n-butyl phthalate were brought into contact, 75 µl of ethanol was added to 10 g of diethoxy magnesium.

As a result of measuring various physical properties of the obtained solid catalyst component by the same method as in Example 1, the average particle size was 27.2 µm. The number of peak tops in the radius range from 0.002 µm to 1 µm measured by the mercury intrusion method was 2. The positions of these peak tops were 0.006 µm and 0.10 µm. Pore volume V1 in this range was 0.23 cm³/g. The number of peak tops in the radius range from larger than 1 µm to 30 µm or smaller was 1. The position of this peak top was 5.1 µm. Pore volume V2 in this range was 0.69 cm³/g. The total pore volume of pores having a radius of 0.002 µm to 30 µm was 0.92 cm³/g. The volume ratio represented by pore volume V1/pore volume V2 was 0.33. The results are shown in Table 2.

The preparation of a catalyst for polymerization of olefins and a catalyst for ethylene-propylene block copolymerization, propylene polymerization and ethylene-propylene block copolymerization were performed in the same way as in Example 1 except that the solid catalyst component described above was used. Various physical properties were measured. The results are shown in Tables 3, 4 and 5.

The obtained ethylene-propylene copolymer had one peak top in a pore radius range from 0.1 µm to 40 µm.

Example 5

A solid catalyst component was prepared in the same way as in Example 3 except that: 10 g of the spherical diethoxy magnesium powder, 50 ml of toluene and 1.8 ml of di-n-butyl phthalate were charged instead of charging 10 g of the spherical diethoxy magnesium powder, 50 ml of toluene and 3.6 ml of di-n-butyl phthalate to create a suspended state;

and when the mixed solution was warmed to 100° C. over 4 hours, 1.8 ml of di-n-butyl phthalate was added at 60° C.

As a result of measuring various physical properties of the obtained solid catalyst component by the same method as in Example 1, the average particle size was 25.4 µm. The number of peak tops in the radius range from 0.002 µm to 1 µm measured by the mercury intrusion method was 2. The positions of these peak tops were 0.006 µm and 0.08 µm. Pore volume V1 in this range was 0.27 cm$^3$/g. The number of peak tops in the radius range from larger than 1 µm to 30 µm or smaller was 1. The position of this peak top was 4.2 µm. Pore volume V2 in this range was 0.67 cm$^3$/g. The total pore volume of pores having a radius of 0.002 µm to 30 µm was 0.94 cm$^3$/g. The volume ratio represented by pore volume V1/pore volume V2 was 0.40. The results are shown in Table 2.

The preparation of a catalyst for polymerization of olefins and a catalyst for ethylene-propylene block copolymerization, propylene polymerization and ethylene-propylene block copolymerization were performed in the same way as in Example 1 except that the solid catalyst component described above was used. Various physical properties were measured. The results are shown in Tables 3, 4 and 5.

The obtained ethylene-propylene copolymer had one peak top in a pore radius range from 0.1 µm to 40 µm.

Example 6

The preparation of a catalyst for ethylene-propylene block copolymerization and ethylene-propylene block copolymerization were performed in the same way as in Example 1 except that: the solid catalyst component obtained in Example 5 was used; and copolymerization reaction was performed under conditions of 1.2 MPa, 70° C. and 100 minutes instead of performing copolymerization reaction under conditions of 1.2 MPa, 70° C. and 60 minutes. Various physical properties were measured.

The results are shown in Tables 4 and 5.

The obtained ethylene-propylene copolymer had one peak top in a pore radius range from 0.1 µm to 40 µm.

Example 7

A solid catalyst component in a powdery form was obtained in the same way as in Example 1 except that: in the preparation of the solid catalyst component described in Example 1, 10 g of the spherical diethoxy magnesium powder obtained in Production Example 2 was used instead of 10 g of the spherical diethoxy magnesium powder obtained in Production Example 1; 150 µl of anhydrous ethanol and 1.8 ml of di-n-butyl phthalate were charged instead of charging 3.6 ml of di-n-butyl phthalate; and after the completion of addition of the suspension, the mixture was stirred for 1 hour while kept in the range from 3 to 7° C., and then warmed to 110° C. over 4 hours, and after addition of 1.8 ml of di-n-butyl phthalate during the warming, the mixture was subjected to contact reaction over 2 hours with stirring at 110° C., instead of warming the mixture to 90° C., and performing contact reaction over 1 hour with stirring.

Various physical properties of the obtained solid catalyst component were measured by the same method as in Example 1.

The formation of a catalyst for polymerization of olefins and propylene polymerization were performed in the same way as in Example 1 except that the solid catalyst component described above was used. The preparation of a catalyst for ethylene-propylene block copolymerization and ethylene-propylene block copolymerization were further performed in the same way as in Example 6 except that: the solid catalyst component described above was used; and diethylaminotriethoxysilane was used instead of cyclohexylmethyldimethoxysilane. Various physical properties were measured.

The results are shown in Tables 2, 3, 4 and 5.

In the obtained solid catalyst component, the average particle size was 27.4 µm. The number of peak tops in the radius range from 0.002 µm to 1 µm measured by the mercury intrusion method was 2. The positions of these peak tops were 0.006 µm and 0.09 µm. Pore volume V1 in this range was 0.33 cm$^3$/g. The number of peak tops in the radius range from larger than 1 µm to 30 µm or smaller was 1. The position of this peak top was 5.1 µm. Pore volume V2 in this range was 0.70 cm$^3$/g. The total pore volume of pores having a radius of 0.002 µm to 30 µm was 1.03 cm$^3$/g. The volume ratio represented by pore volume V1/pore volume V2 was 0.47. The obtained ethylene-propylene copolymer had one peak top in a pore radius range from 0.1 µm to 40 µm.

Example 8

A solid catalyst component in a powdery form was obtained in the same way as in Example 1 except that: in the preparation of the solid catalyst component described in Example 1, 10 g of the spherical diethoxy magnesium powder obtained in Production Example 2 and 30 ml of toluene were charged instead of charging 10 g of the spherical diethoxy magnesium powder obtained in Production Example 1, 50 ml of toluene and 3.6 ml of di-n-butyl phthalate; the suspension was added over 2 hours into the mixed solution of 26 ml of toluene and 24 ml of titanium tetrachloride while the temperature of the reaction system was kept in the range from −8 to −4° C., instead of adding the suspension over 4 hours into the mixed solution of 26 ml of toluene and 24 ml of titanium tetrachloride while keeping the temperature of the reaction system in the range from −7 to −2° C.; and after the completion of addition of the suspension, the mixture was stirred for 1 hour while kept in the range from −8 to −4° C., and after addition of 3.2 ml of 2-ethoxyethyl-1-ethyl carbonate and 1.4 ml of 2-isopropyl-2-isopentyl-1,3-dimethoxypropane, the mixture was warmed to 100° C. and subjected to contact reaction over 2 hours with stirring at 100° C., instead of warming the mixture to 90° C., and performing contact reaction over 1 hour with stirring.

Various physical properties of the obtained solid catalyst component were measured by the same method as in Example 1.

The formation of a catalyst for polymerization of olefins and propylene polymerization were performed in the same way as in Example 1 except that the solid catalyst component described above was used. The preparation of a catalyst for ethylene-propylene block copolymerization and ethylene-propylene block copolymerization were further performed in the same way as in Example 6 except that the solid catalyst component described above was used. Various physical properties were measured.

The results are shown in Tables 2, 3, 4 and 5.

In the obtained solid catalyst component, the average particle size was 27.8 µm. The number of peak tops in the radius range from 0.002 µm to 1 µm measured by the mercury intrusion method was 2. The positions of these peak tops were 0.01 µm and 0.06 µm. Pore volume V1 in this range was 0.40 cm$^3$/g. The number of peak tops in the radius range from larger than 1 μm to 30 μm or smaller was 1. The position of this peak top was 5.1 μm. Pore volume V2 in this range was 0.77 cm³/g. The total pore volume of pores having a radius of 0.002 μm to 30 μm was 1.17 cm³/g. The volume ratio represented by pore volume V1/pore volume V2 was 0.52. The obtained ethylene-propylene copolymer had one peak top in a pore radius range from 0.1 μm to 40 μm.

TABLE 2

|  | Average particle size $D_{50}$ μm | $N_2SA$ m²/g | V1 cm³/g | V2 cm³/g | V1/V2 | Total pore volume cm³/g |
|---|---|---|---|---|---|---|
| Example 1 | 31.2 | 113 | 0.28 | 0.75 | 0.37 | 1.03 |
| Example 2 | 28.2 | 66 | 0.30 | 0.75 | 0.40 | 1.05 |

TABLE 2-continued

|  | Average particle size $D_{50}$ μm | $N_2SA$ m²/g | V1 cm³/g | V2 cm³/g | V1/V2 | Total pore volume cm³/g |
|---|---|---|---|---|---|---|
| Comparative Example 1 | 23.4 | 18 | 0.44 | 0.64 | 0.69 | 1.08 |
| Example 3 | 23.3 | — | 0.21 | 0.61 | 0.34 | 0.82 |
| Comparative Example 2 | 23.3 | 2 | 0.19 | 0.65 | 0.29 | 0.84 |
| Example 4 | 27.2 | 33 | 0.23 | 0.69 | 0.33 | 0.92 |
| Example 5 | 25.4 | — | 0.27 | 0.67 | 0.40 | 0.94 |
| Example 7 | 27.4 | — | 0.33 | 0.70 | 0.47 | 1.03 |
| Example 8 | 27.8 | — | 0.40 | 0.77 | 0.52 | 1.17 |

TABLE 3

|  | Propylene polymerization activity (g-PP/g-cat) | Amount of fine powder <75 μm (% by mass) | Amount of coarse powder >1700 μm (% by mass) | Average particle size $D_{50}$ (μm) | Particle size distribution index SPAN | Bulk specific gravity (g/ml) |
|---|---|---|---|---|---|---|
| Example 1 | 39,700 | 0.2 | 0.8 | 780 | 0.96 | 0.41 |
| Example 2 | 40,500 | 0.6 | 0.3 | 740 | 0.92 | 0.40 |
| Comparative Example 1 | 39,600 | 2.3 | 0.2 | 760 | 1.26 | 0.39 |
| Example 3 | 51,500 | 0.2 | 0.1 | 710 | 0.83 | 0.40 |
| Comparative Example 2 | 49,800 | 0.3 | 2.4 | 840 | 0.97 | 0.39 |
| Example 4 | 52,600 | 0.1 | 1.8 | 830 | 0.91 | 0.40 |
| Example 5 | 59,700 | 0.1 | 1.4 | 800 | 0.69 | 0.41 |
| Example 7 | 56,500 | 0.1 | 1.5 | 820 | 0.75 | 0.41 |
| Example 8 | 51,300 | 0.2 | 1.2 | 830 | 0.70 | 0.40 |

TABLE 4

|  | Homo stage (PP) polymerization | | | Ethylene-propylene block copolymerization | | | |
|---|---|---|---|---|---|---|---|
|  | Homo activity (g-PP/g-cat) | Polymer pore volume (cm³/g) | XS (wt %) | Impact copolymer activity g-ICP/g-cat-hr | Copolymer pore volume (cm³/g) | Pore volume at radius of 1 to 20 μm (cm³/g) | EPR content (% by mass) |
| Example 1 | 32,800 | 0.18 | 1.3 | 11,800 | 0.12 | 0.09 | 23.8 |
| Example 2 | 31,800 | 0.20 | 1.4 | 10,100 | 0.17 | 0.15 | 20.5 |
| Comparative Example 1 | 32,400 | 0.27 | 1.7 | 9,600 | 0.24 | 0.22 | 20.0 |
| Example 3 | 38,000 | 0.23 | 1.4 | 12,000 | 0.18 | 0.17 | 20.2 |
| Comparative Example 2 | 41,200 | 0.17 | 1.8 | 14,700 | 0.09 | 0.08 | 22.1 |
| Example 4 | 45,500 | 0.19 | 1.5 | 17,800 | 0.13 | 0.11 | 23.6 |
| Example 5 | 44,900 | 0.18 | 1.4 | 16,400 | 0.15 | 0.12 | 22.8 |
| Example 6 | 44,100 | — | 1.4 | 29,300 | 0.13 | 0.10 | 38.2 |
| Example 7 | 34,000 | 0.24 | 0.9 | 12,400 | 0.20 | 0.18 | 23.5 |
| Example 8 | 36,500 | 0.26 | 1.3 | 22,900 | 0.13 | 0.10 | 32.4 |

TABLE 5

|  | Polymer (PP) at homo stage | | | Copolymer (ICP) | | |  |
|---|---|---|---|---|---|---|---|
|  | Pore radius of peak top in pore volume distribution (μm) | Half width of peak of pore volume (μm) | Half width of peak of pore volume/pore radius of peak top in pore volume distribution | Pore radius of peak top in pore volume distribution (μm) | Half width of peak of pore volume (μm) | Half width of peak of pore volume/pore radius of peak top in pore volume distribution | Polymer flowability (g/sec) |
| Example 1 | 5.1 | 9.0 | 1.76 | 7.4 | 12.5 | 1.69 | 13.0 |
| Example 2 | 7.4 | 12.0 | 1.62 | 9.4 | 13.3 | 1.41 | 12.3 |

TABLE 5-continued

| | Polymer (PP) at homo stage | | | Copolymer (ICP) | | | |
|---|---|---|---|---|---|---|---|
| | Pore radius of peak top in pore volume distribution (μm) | Half width of peak of pore volume (μm) | Half width of peak of pore volume/pore radius of peak top in pore volume distribution | Pore radius of peak top in pore volume distribution (μm) | Half width of peak of pore volume (μm) | Half width of peak of pore volume/pore radius of peak top in pore volume distribution | Polymer flowability (g/sec) |
| Comparative Example 1 | 5.1 | 12.4 | 2.43 | 6.2 | 15.5 | 2.50 | 11.5 |
| Example 3 | 6.0 | 8.9 | 1.48 | 8.1 | 12.1 | 1.49 | 13.3 |
| Comparative Example 2 | 4.1 | 12.8 | 3.12 | 5.1 | 16.5 | 3.24 | 11.6 |
| Example 4 | 6.4 | 8.3 | 1.30 | 7.4 | 11.3 | 1.53 | 13.2 |
| Example 5 | 2.6 | 2.1 | 0.81 | 4.1 | 3.5 | 0.85 | 13.4 |
| Example 6 | — | — | — | 4.8 | 4.6 | 0.96 | 12.9 |
| Example 7 | 4.1 | 4.5 | 1.10 | 5.9 | 7.2 | 1.22 | 13.1 |
| Example 8 | 3.3 | 2.8 | 0.85 | 5.9 | 5.6 | 0.95 | 12.4 |

As seen from Tables 3, 4 and 5, the solid catalyst components for polymerization of olefins in Example 1 to Example 6 comprised titanium, magnesium, a halogen atom and an internal electron donor, had a multimodal pore volume distribution measured by a mercury intrusion method, and had one or more peak tops in each of a pore radius range from 0.002 μm to 1 μm and a pore radius range from larger than 1 μm to 30 μm or smaller, and the ratio represented by pore volume V1 derived from pores in the radius range from 0.002 μm to 1 μm/pore volume V2 derived from pores in the radius range from larger than 1 μm to 30 μm or smaller was 0.30 to 0.65, demonstrating that solid catalyst component for polymerization of olefins can be provided which is capable of producing a polymer that has very low adherence ascribable to the stickiness (tackiness) of polymer particles, is excellent in flowability, and also has a favorable particle size distribution, in order to polymerize olefins, particularly, to copolymerize propylene and ethylene.

On the other hand, as seen from Tables 3, 4 and 5, the solid catalyst components for polymerization of olefins obtained in Comparative Example 1 and Comparative Example 2 were shown to have a large amount of a fine powder and a low particle size distribution (Comparative Example 1), to have a large amount of a coarse powder (Comparative Example 2), or to be inferior in polymer flowability, because the ratio represented by pore volume V1 derived from pores in the radius range from 0.002 μm to 1 μm/pore volume V2 derived from pores in the radius range from larger than 1 μm to 30 μm or smaller fell outside the range from 0.30 to 0.65.

INDUSTRIAL APPLICABILITY

The present invention can provide a solid catalyst component for polymerization of olefins which is capable of producing a polymer that has very low adherence ascribable to the stickiness (tackiness) of polymer particles, is excellent in flowability, and also has a favorable particle size distribution, in order to polymerize olefins, particularly, to perform the copolymerization reaction, such as random copolymerization or block copolymerization, of propylene and ethylene, and can also provide a method for producing a solid catalyst component for polymerization of olefins, a catalyst for polymerization of olefins, and a method for producing a propylene copolymer.

Particularly, when the propylene copolymer according to the present invention is a propylene block copolymer (impact copolymer: ICP) having a propylene-ethylene copolymer (ethylene-propylene rubber: EPR) content, a large molded product excellent in rigidity and impact resistance can be provided inexpensively with high quality. Therefore, the propylene copolymer according to the present invention is very beneficial in the fields of automobile parts, home appliance parts, and the like required to have high rigidity and high impact resistance.

The invention claimed is:

1. A solid catalyst component for polymerization of olefins, comprising
    titanium, magnesium, a halogen atom and an internal electron donor, wherein
    the solid catalyst component has a multimodal pore volume distribution measured by a mercury intrusion method and has one or more peak tops in each of a pore radius range from 0.002 μm to 1 μm and a pore radius range from larger than 1 μm to 30 μm or smaller, and
    a ratio represented by pore volume V1 derived from pores in the radius range from 0.002 μm to 1 μm/pore volume V2 derived from pores in the radius range from larger than 1 μm to 30 μm or smaller is 0.30 to 0.65.

2. The solid catalyst component for polymerization of olefins according to claim 1, wherein a total pore volume measured by the mercury intrusion method is 0.65 to 2.00 cm$^3$/g.

3. The solid catalyst component for polymerization of olefins according to claim 1, wherein the pore volume V1 derived from pores in the radius range from 0.002 μm to 1 μm is 0.1 to 0.8 cm$^3$/g.

4. The solid catalyst component for polymerization of olefins according to claim 1, wherein the pore volume V2 derived from pores in the radius range from larger than 1 μm to 30 μm or smaller is 0.3 to 1.5 cm$^3$/g.

5. The solid catalyst component for polymerization of olefins according to claim 1, wherein a specific surface area measured by a BET method is 1 to 500 m$^2$/g.

6. The solid catalyst component for polymerization of olefins according to claim 1, wherein the internal electron donor is one or more compounds selected from an ester compound, an ether compound and a carbonate compound.

7. A method for producing a solid catalyst component for polymerization of olefins according to claim 1, comprising the step of bringing a magnesium compound having an alkoxy group, a titanium halide compound and an internal electron donor into contact with each other, wherein for the contact between the magnesium compound having an alkoxy group and the titanium halide compound, the magnesium compound having an alkoxy group is added to the titanium halide compound or alternatively the titanium halide compound is added to the magnesium compound having an alkoxy group continuously or intermittently over 2 hours or longer while a temperature of 15° C. or lower is kept.

8. The method for producing a solid catalyst component for polymerization of olefins according to claim 7, wherein the magnesium compound having an alkoxy group is dialkoxy magnesium.

9. The method for producing a solid catalyst component for polymerization of olefins according to claim 7, wherein the magnesium compound having an alkoxy group has a spherical or ellipsoidal particle shape, has a multimodal pore volume distribution defined by the mercury intrusion method, and has one or more peak tops in each of a pore radius range from 0.002 μm to 1 μm and a pore radius range from larger than 1 μm to 30 μm or smaller.

10. The method for producing a solid catalyst component for polymerization of olefins according to claim 7, wherein the magnesium compound having an alkoxy group has a total pore volume of 1.3 to 3.0 cm³/g defined by the mercury intrusion method.

11. The method for producing a solid catalyst component for polymerization of olefins according to claim 7, wherein the magnesium compound having an alkoxy group has a pore volume of 0.3 cm³/g or larger derived from pores in a pore radius range from 0.002 μm to 1 μm, defined by the mercury intrusion method.

12. The method for producing a solid catalyst component for polymerization of olefins according to claim 7, wherein the magnesium compound having an alkoxy group has a pore volume of 0.5 to 2.0 cm³/g derived from pores in a pore radius range from larger than 1 μm to 30 μm or smaller, defined by the mercury intrusion method.

13. The method for producing a solid catalyst component for polymerization of olefins according to claim 7, wherein the magnesium compound having an alkoxy group comprises 0.1 to 1.5 parts by mass of an alcohol per 100 parts by mass of the magnesium compound having an alkoxy group.

14. The method for producing a solid catalyst component for polymerization of olefins according to claim 7, wherein in the step of bringing the magnesium compound having an alkoxy group and the titanium halide compound into contact with each other, the magnesium compound having an alkoxy group is added to the titanium halide compound continuously or intermittently over 2 hours or longer while a temperature of 15° C. or lower is kept.

15. The method for producing a solid catalyst component for polymerization of olefins according to claim 7, wherein the internal electron donor is brought two or more times into contact with the magnesium compound having an alkoxy group, the titanium halide compound or a mixture of the magnesium compound having an alkoxy group and the titanium halide compound.

16. A catalyst for polymerization of olefins, comprising a contact product of a solid catalyst component for polymerization of olefins according to claim 1, an organoaluminum compound represented by the following general formula (I):

$$R^1_p AlQ_{3-p} \quad (I)$$

wherein $R^1$ is an alkyl group having 1 to 6 carbon atoms; Q is a hydrogen atom or a halogen atom; p is a real number of $0 < p \leq 3$; when a plurality of $R^1$ moieties are present, these $R^1$ moieties are the same as or different from each other; and when a plurality of Q moieties are present, these Q moieties are the same as or different from each other, and an external electron-donating compound.

17. The catalyst for polymerization of olefins according to claim 16, wherein the external electron-donating compound is at least one organosilicon compound selected from the following general formula (II):

$$R^2_q Si(OR^3)_{4-q} \quad (II)$$

wherein $R^2$ is an alkyl group having 1 to 12 carbon atoms, a cycloalkyl group having 3 to 12 carbon atoms, a phenyl group, a vinyl group, an allyl group or an aralkyl group, and a plurality of $R^2$ moieties are the same or different; $R^3$ is an alkyl group having 1 to 4 carbon atoms, a cycloalkyl group having 3 to 6 carbon atoms, a phenyl group, an alkylamino group having 1 to 12 carbon atoms, a dialkylamino group having 1 to 12 carbon atoms, a vinyl group, an allyl group or an aralkyl group, and a plurality of $R^3$ moieties are the same or different; and q is an integer of $0 \leq q \leq 3$, and the following general formula (III):

$$(R^4 R^5 N)_s SiR^6_{4-s} \quad (III)$$

wherein $R^4$ and $R^5$ each are a hydrogen atom, a linear alkyl group having 1 to 20 carbon atoms, a branched alkyl group having 3 to 20 carbon atoms, a vinyl group, an allyl group, an aralkyl group, a cycloalkyl group having 3 to 20 carbon atoms or an aryl group and are the same or different, or $R^4$ and $R^5$ are optionally bonded to each other to form a ring; $R^6$ is a linear alkyl group having 1 to 20 carbon atoms, a branched alkyl group having 3 to 20 carbon atoms, a vinyl group, an allyl group, an aralkyl group, a cycloalkyl group having 3 to 20 carbon atoms or an aryl group; when a plurality of $R^6$ moieties are present, the plurality of $R^6$ moieties are the same or different; and s is an integer of 1 to 3.

18. A method for producing a polymer of an olefin, comprising polymerizing the olefin in the presence of a catalyst for polymerization of olefins according to claim 16.

19. A method for producing a propylene copolymer, comprising polymerizing propylene using a catalyst for polymerization of olefins according to claim 16, and subsequently copolymerizing two or more olefins.

* * * * *